US012781852B2

(12) United States Patent
Sugimura

(10) Patent No.: US 12,781,852 B2
(45) Date of Patent: Nov. 3, 2026

(54) BOOT

(71) Applicant: HI-LEX CORPORATION, Hyogo (JP)

(72) Inventor: Masachika Sugimura, Hyogo (JP)

(73) Assignee: HI-LEX CORPORATION, Hyogo (JP)

( * ) Notice: Subject to any disclaimer, the term of this patent is extended or adjusted under 35 U.S.C. 154(b) by 0 days.

(21) Appl. No.: 18/730,906

(22) PCT Filed: Feb. 6, 2023

(86) PCT No.: PCT/JP2023/003695
§ 371 (c)(1),
(2) Date: Dec. 27, 2024

(87) PCT Pub. No.: WO2023/149568
PCT Pub. Date: Aug. 10, 2023

(65) Prior Publication Data

US 2025/0347343 A1 Nov. 13, 2025

(30) Foreign Application Priority Data

Feb. 4, 2022 (JP) ................................ 2022-016520

(51) Int. Cl.
*F16J 3/04* (2006.01)
*F16J 15/52* (2006.01)

(52) U.S. Cl.
CPC ............... *F16J 3/041* (2013.01); *F16J 3/042* (2013.01); *F16J 3/048* (2013.01); *F16J 15/52* (2013.01)

(58) Field of Classification Search
CPC .... F16J 3/041; F16J 3/042; F16J 3/048; F16J 15/52
See application file for complete search history.

(56) References Cited

U.S. PATENT DOCUMENTS 4,469,337 A * 9/1984 Yokoi ............... F16D 55/22655 188/73.31
4,678,064 A * 7/1987 Adachi ................. F16D 55/227 277/648

(Continued)

FOREIGN PATENT DOCUMENTS

JP S62188855 A 8/1987
JP H0740161 A 2/1995

(Continued)

OTHER PUBLICATIONS

International Search Report from corresponding PCT Application No. PCT/JP2023/003695, Mar. 28, 2023.

*Primary Examiner* — Nicholas L Foster
(74) *Attorney, Agent, or Firm* — Workman Nydegger

(57) ABSTRACT

A boot disclosed is formed into a cylindrical shape that is extendable and contractible in an axis direction and can be mounted to a mounting portion of a mounting target object by injecting fluid inside the boot by a fluid injecting unit. The boot comprises an annular mounted portion that is provided on one end side and is to be mounted to the mounting portion, an abutting portion that is provided on an other end side and onto which a tip of the fluid injecting unit can abut, and an extendable/contractible portion between the mounted portion and the abutting portion. The abutting portion extends along a radial direction, is formed into an annular shape along a direction around the axis of the boot and is provided with an opening that allows fluid communication between an inside and an outside of the boot.

4 Claims, 10 Drawing Sheets

(56) References Cited

U.S. PATENT DOCUMENTS

| | | | | |
|---|---|---|---|---|
| 4,926,979 | A * | 5/1990 | Odaka | F16D 55/227 188/73.44 |
| 5,051,105 | A * | 9/1991 | Sugiura | F16J 3/041 277/637 |
| 5,261,678 | A * | 11/1993 | Takemori | F16D 55/22655 277/630 |
| 5,457,865 | A | 10/1995 | Iijima | |
| 5,611,131 | A | 3/1997 | Iijima | |
| 7,070,186 | B2 * | 7/2006 | Creek | F16J 3/042 277/393 |
| 7,338,384 | B2 * | 3/2008 | Patrascu | F16D 3/845 464/175 |
| 7,513,831 | B2 * | 4/2009 | Patrascu | F16D 3/845 464/175 |
| 12,000,445 | B2 * | 6/2024 | Osada | F16D 65/16 |
| 12,535,135 | B2 * | 1/2026 | Sugimura | F16J 15/52 |
| 2004/0256814 | A1 * | 12/2004 | Creek | F16J 3/042 277/634 |
| 2006/0040752 | A1 * | 2/2006 | Ishijima | F16D 3/845 464/175 |
| 2007/0087847 | A1 * | 4/2007 | Patrascu | F16J 3/042 464/175 |
| 2008/0153608 | A1 * | 6/2008 | Patrascu | F16J 3/042 464/175 |
| 2008/0258409 | A1 * | 10/2008 | Kumazaki | F16D 3/845 277/636 |
| 2010/0197413 | A1 | 8/2010 | Takabe | |
| 2022/0056972 | A1 * | 2/2022 | Osada | F16D 65/18 |
| 2025/0243934 | A1 * | 7/2025 | Sugimura | F16J 3/043 |

FOREIGN PATENT DOCUMENTS

| | | | |
|---|---|---|---|
| JP | 2009068510 | A | 4/2009 |
| JP | 2010007769 | A | 1/2010 |
| JP | 2013036579 | A | 2/2013 |

* cited by examiner

BOOT

TECHNICAL FIELD

The present invention relates to a boot.

BACKGROUND ART

When a forward/backward movement member moves forward/backward with respect to a target member, a boot that is extendable and contractible in a forward/backward direction is used to protect the forward/backward movement member and the target member from water and dust at a connection portion between the forward/backward movement member and the target member. Mounting of the boot to the forward/backward movement member or the target member (hereinafter collectively referred to as a "mounting target object") is performed by fitting the end of the boot into a mounting portion of the mounting target object. In order to easily fit the end of the boot into the mounting portion of the mounting target object, for example, the mounting portion is applied with grease or formed into a tapered shape. However, when the boot is used as an appearance part, a greaseless design is desired because grease easily drips, and dust in the air easily adheres to the grease and remains thereon, thereby impairing the external appearance of the mounting target object. Moreover, if the mounting portion of the mounting target object is formed into a tapered shape, the size of the mounting portion becomes large, and therefore, if a mounting space around the mounting target object is small, the mounting portion cannot be formed into a tapered shape.

In order to fit the end of the boot into the mounting portion of the mounting target object, besides the method of applying grease to the mounting portion and the method of forming the mounting portion into a tapered shape, the automatic assembling method of the boot disclosed in Patent Document 1 is used. In the method of Patent Document 1, an inserter is inserted and fitted inside a small-diameter annular seal portion at one end of the boot, and air is injected into the inside of the boot by an air supply means via the inserter, so that a large-diameter annular seal portion at an other end of the boot enlarges in diameter, climbs over a protruding end of a cylinder body that is a mounting target object, and is fitted into a seal groove that is a mounting portion of the cylinder body.

PRIOR ART DOCUMENT

Patent Document

Patent Document 1: JP H7-40161 A

SUMMARY OF THE INVENTION

Problems to be Solved by the Invention

However, in the boot of Patent Document 1, although the inserter is fitted into the inside of the small-diameter annular seal portion at one end of the boot, the small-diameter annular seal portion is movable in an axis direction with respect to the inserter, and therefore, if the small-diameter annular seal portion receives a strong force in the axis direction, the small-diameter annular seal portion slides on the outer peripheral surface of the inserter. Therefore, when air is injected into the inside of the boot via the inserter, the diameter of the large-diameter annular seal portion at the other end of the boot enlarges, and a force acts on the small-diameter annular seal portion at one end of the boot, which may cause the small-diameter annular seal portion to move along the inserter in an extending direction of the boot. If the internal space expands due to the extension of the boot, the large-diameter annular seal portion at the other end of the boot cannot sufficiently enlarge in diameter, and therefore, the large-diameter annular seal portion cannot climb over the protruding end of the cylinder body and may not be able to fit into the seal groove of the cylinder body.

It is an object of the present invention to provide a boot that can be easily mounted to a mounting portion of a mounting target object.

Means to Solve the Problem

The boot of the present invention is a boot that extends along an axis direction, is formed into a tubular shape that is extendable and contractible in the axis direction, and can be mounted to a mounting portion of a mounting target object by injecting fluid inside the boot by a fluid injecting unit, wherein the boot comprises an annular mounted portion that is provided on one end side in the axis direction and is to be mounted to the mounting portion, an abutting portion that is provided on an other end side in the axis direction and onto which a tip of the fluid injecting unit can abut toward the one end side in the axis direction along the axis direction, and an extendable/contractible portion that extends along the axis direction between the mounted portion and the abutting portion, and wherein the abutting portion extends along a radial direction on the other end side of the boot in the axis direction of the boot, is formed into an annular shape along a direction around the axis of the boot, and is provided, on an inner side in the radial direction of the abutting portion, with an opening that allows fluid communication between an inside and an outside of the boot.

Effects of the Invention

According to the present invention, it is possible to provide a boot that can be easily mounted to a mounting portion of a mounting target object.

EMBODIMENT FOR CARRYING OUT THE INVENTION

The boot according to one embodiment of the present invention will be described below with reference to the drawings. However, embodiments shown below are merely examples, and the boot of the present invention is not limited to the following embodiments.

In the present specification, "perpendicular to A" and similar expressions do not only refer to a direction strictly perpendicular to A, but also refer to the direction including being substantially perpendicular to A. Moreover, in the present specification, "parallel to B" and similar expressions do not only refer to a direction strictly parallel to B, but also refer to the direction including being substantially parallel to B. In addition, in the present specification, "C-shape" and similar expressions do not only refer to a strict C-shape, but also refer to the shape including a shape visually associated with a C-shape (substantially a C-shape).

Figure 1:
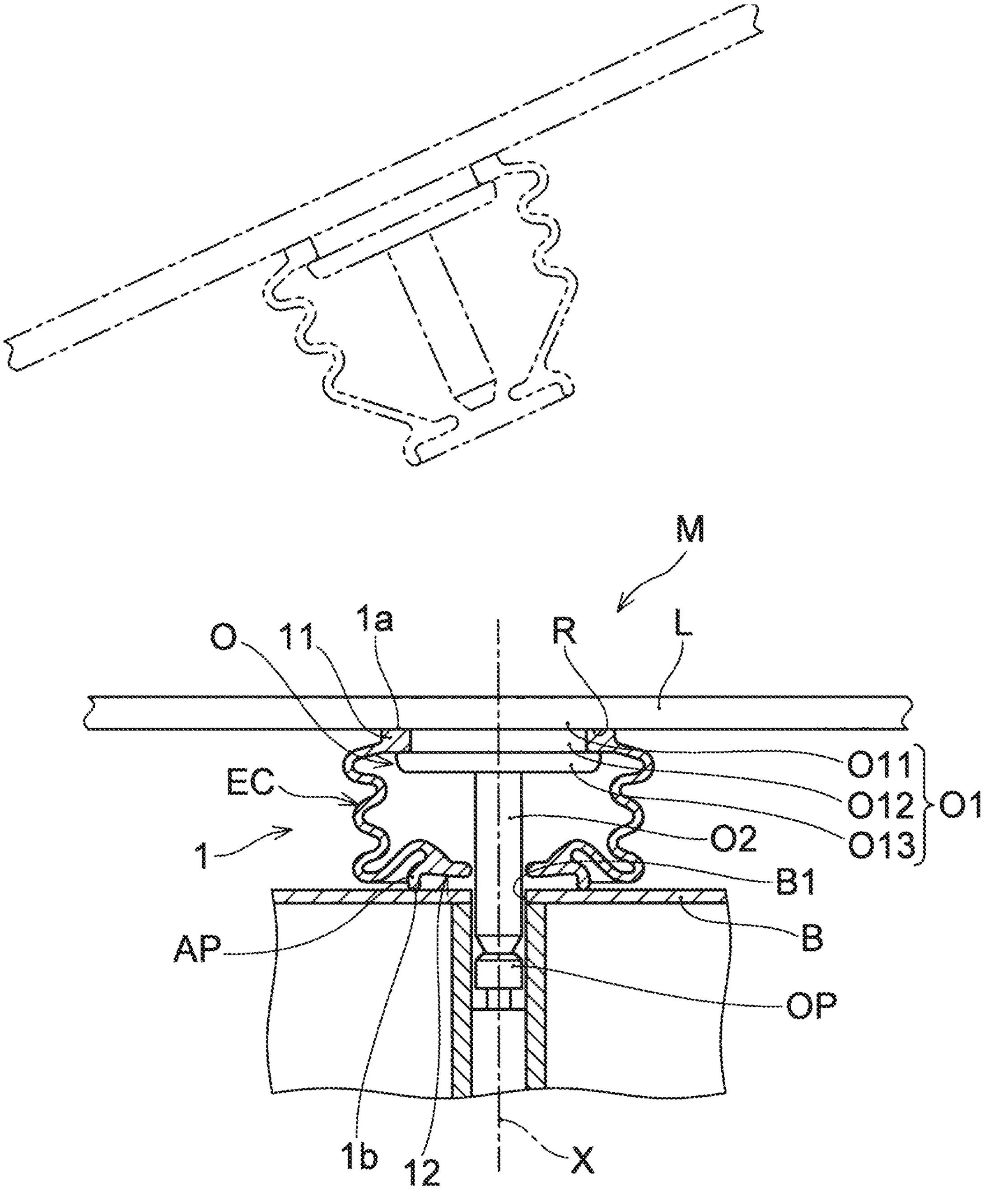
FIG. 1 is a schematic view showing a lid opening/closing device to which a boot according to one embodiment of the present invention is mounted.
Figure 2:
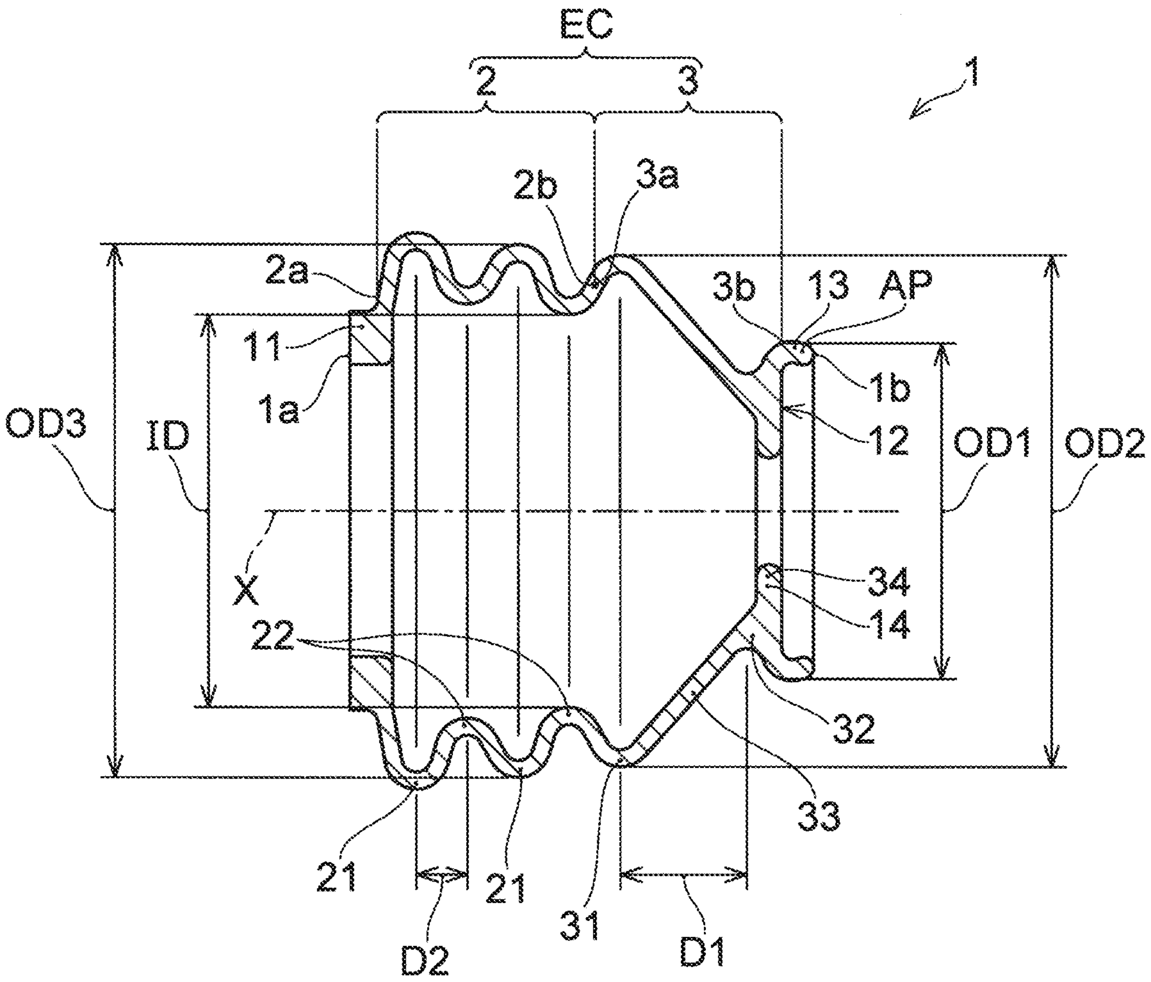
FIG. 2 is a sectional view of a boot according to one embodiment of the present invention.

As shown in FIGS. 1 and 2, the boot 1 of the present embodiment is a tubular boot that extends along an axis X direction from one end 1*a* to an other end 1*b* in the axis X direction, which is a central axis of the boot 1, and that is extendable and contractible in the axis X direction. The boot 1 is configured to be able to transition between an extended state where the boot 1 is extended in the axis X direction (state indicated by the two-dot chain line in FIG. 1) and a compressed state where the boot 1 is compressed in the axis X direction (state indicated by the solid line in FIG. 1). The boot 1 protects an internal space on an inner side in a radial direction of the boot 1 and optionally another space communicating with the internal space (for example, if the boot 1 is connected to a tubular member different from the boot 1, an internal space of the different tubular member) from an external environment (for example, suppresses water, dust, etc. from entering), in the extended and compressed states. The boot 1 is applied to, for example, a mounting target having a mounting target object to which the boot 1 is mounted, and protects a predetermined portion of the mounting target arranged in the internal space and optionally in another space from the external environment. The boot 1 can be applied to any mounting target that requires protection, without particular limitations, as long as the boot 1 can protect a particular portion of the mounting target to which the boot 1 is applied. Further, the mounting target object to which the boot 1 is mounted is also not particularly limited, and can be varied appropriately depending on the mounting target to which the boot 1 is applied.

For example, as shown in FIG. 1, the boot 1 is applied to a mounting target M having a base B and a movable portion L that is movable between a distal position (position indicated by the two-dot chain line in FIG. 1) and a proximal position (position indicated by the solid line in FIG. 1) with respect to the base B. The boot 1 is mounted to the mounting target M so that one end 1*a* of the boot 1 in the axis X direction is mounted to the movable portion L and the other end 1*b* of the boot 1 in the axis X direction constitutes a released free end when the movable portion L is in the distal position. The boot 1 is arranged so that the other end 1*b* of the boot 1 abuts onto the base B when the movable portion L approaches the base B from the distal position toward the proximal position. With the other end 1*b* of the boot 1 abutting onto the base B, the boot 1 covers an opening B1 provided on the base B. The boot 1 is in an extended state of its natural length until the movable portion L approaches the base B to reach a position where the boot 1 abuts onto the base B, and transitions to a compressed state (state indicated by the solid line in FIG. 1) where the boot 1 is compressed between the movable portion L and the base B in the axis X direction when the movable portion L moves further from that position toward the proximal position. During transition between the extended state and the compressed state with the boot 1 abutting onto the base B, the boot 1 covers the opening B1 of the base B to protect the inside of the opening B1 from the external environment (for example, suppress water, dust, etc. from entering). Conversely, when the movable portion L moves from the proximal position to the distal position, the boot 1 is restored to the extended state by a restoring force of the boot 1 itself. It is to be noted that, although the boot 1 is mounted to the movable portion L in the illustrated example, the boot 1 may be mounted to the base B. Further, the boot 1 may be mounted to the mounting target M so that one end 1*a* of the boot 1 is mounted to the movable portion L, the other end 1*b* of the boot 1 is mounted to the base B, and the boot 1 is extended and contracted by relative movement between the movable portion L and the base B.

The mounting target M is not particularly limited, examples of which include, for example, a lid opening/closing device M that opens and closes a lid L, for refueling or power-supplying a vehicle, as shown in FIG. 1. As shown in FIG. 1, the lid opening/closing device M, which is a mounting target, comprises a part of a vehicle body that is a base (hereinafter referred to as a vehicle body B) and a lid L that is a movable portion that opens and closes a refueling or power-supplying space (space between the lid L and the vehicle body B indicated by the solid line in FIG. 1) adjacent to a refueling or power-supplying port provided in the vehicle body. The lid L is configured to be movable between an opened position that opens the refueling or power-supplying space (distal position, a position indicated by the two-dot chain line in FIG. 1) and a closed position that closes the refueling or power-supplying space (proximal position, a position indicated by the solid line in FIG. 1). The lid L is further configured to be able to move to an advanced position further on the vehicle body B side relative to the closed position (position further below from the position indicated by the solid line in FIG. 1) by being further pressed toward the vehicle body B when the lid L is in the closed position.

As shown in FIG. 1, the lid L is provided with a mounting target object O having a mounting portion O1 to which a mounted portion 11, which will be mentioned later, provided on one end 1*a* side of the boot 1, is to be mounted. The mounting portion O1 has a first large-diameter portion O11, a small-diameter portion O12, and a second large-diameter portion O13 that are provided in line along the axis X direction of the boot 1 when the boot 1 is mounted. The first large-diameter portion O11, the small-diameter portion O12, and the second large-diameter portion O13 are formed so as to extend in a direction perpendicular to the axis X direction of the boot 1 when the boot 1 is mounted. The first and second large-diameter portions O11, O13 are formed to have a size to protrude from the outer periphery of the small-diameter portion O12 in a direction perpendicular to the axis X direction of the boot 1 when the boot 1 is mounted. A recessed portion R is thereby formed between the first large-diameter portion O11 and the second large-diameter portion O13 along the outer periphery of the small-diameter portion O12. The boot 1 is mounted to the mounting portion O1 by fitting the mounted portion 11 of the boot 1 into this recessed portion R. When the mounted portion 11 is mounted to the mounting portion O1, the mounted portion 11 engages with the first and second large-diameter portions O11, O13 in the axis X direction, thereby restricting movement in the axis X direction, and the mounted portion 11 engages with the small-diameter portion O12 in the direction perpendicular to the axis X direction, thereby restricting movement in the direction perpendicular to the axis X direction. It is to be noted that the mounting portion O1 is not limited to the structure mentioned above as long as the mounting portion O1 is formed so that the mounted portion 11 is mounted thereto. For example, the first large-diameter portion O11, the small-diameter portion O12, and the second large-diameter portion O13 are each formed into a continuous plate shape in the illustrated example, but if the mounting target object O is provided on another mounting target, they may have another shape such that they have a through hole on the center side thereof. Moreover, although the first large-diameter portion O11 is configured with a part of the lid L in the illustrated example, the first large-diameter portion O11 may be provided separately from the lid L.

The lid opening/closing device M further has a locking member (not shown) that locks/unlocks the lid L with respect to the vehicle body B, a locking member drive section (not shown) that moves the locking member to locking and unlocking positions, and an operation portion OP (see FIG. 1) that is operated to drive the locking member drive section. In the lid opening/closing device M, as shown in FIG. 1, the mounting target object O provided on the lid L has an extension portion O2 that extends along the axis X direction in at least a part of the inside of the boot 1 when the boot 1 is mounted. The extension portion O2 has a function of pressing the operation portion OP in order to operate the operation portion OP. When the lid L is in the closed position, the lid L is further pressed toward the vehicle body B to move to the advanced position, thereby pressing the operation portion OP via the extension portion O2 (pressing it downward in FIG. 1). When the operation portion OP is pressed, the operation portion OP is operated to drive the locking member drive section having a motor, etc. The locking member, which is operated by driving the locking member drive section, moves between a locking position where the locking member engages with the lid L to allow the lid L to be locked in the closed position and an unlocking position where the locking member is disengaged from the lid L to allow the lid L to be moved to the opened position. It is to be noted that the extension portion O2 of the mounting target object O has the function of pressing the operating portion OP in the lid opening/closing device M, but, if the mounting target object O is provided on another mounting target, the extension portion O2 may have another function and may not necessarily be provided on the mounting target object O.

In the lid opening/closing device M, as the lid L moves, the boot 1 mounted to the lid L also moves. The boot 1 covers the opening B1 of the vehicle body B as the other end 1*b* of the boot 1 abuts onto the vehicle body B in the middle of movement of the lid L from the opened position to the closed position. When the lid L is located between a position where the other end 1*b* of the boot 1 abuts onto the vehicle body B and the closed position (and the advanced position), the boot 1 covers the opening B1 of the vehicle body B in the compressed state where the boot 1 is compressed in the axis X direction to suppress water, dust, etc. from entering the locking member drive section, etc. provided in the vehicle body B through the opening B1. Conversely, when the lid L moves from the closed position (and the advanced position) to the opened position, the boot 1 is separated from the vehicle body B and restored to the extended state by the restoring force of the boot 1 itself. It is to be noted that the base B onto which the boot 1 abuts may be a housing that may be mounted to the vehicle body and may accommodate the locking member, the locking member drive section, and the operation portion OP.

Figure 10A:
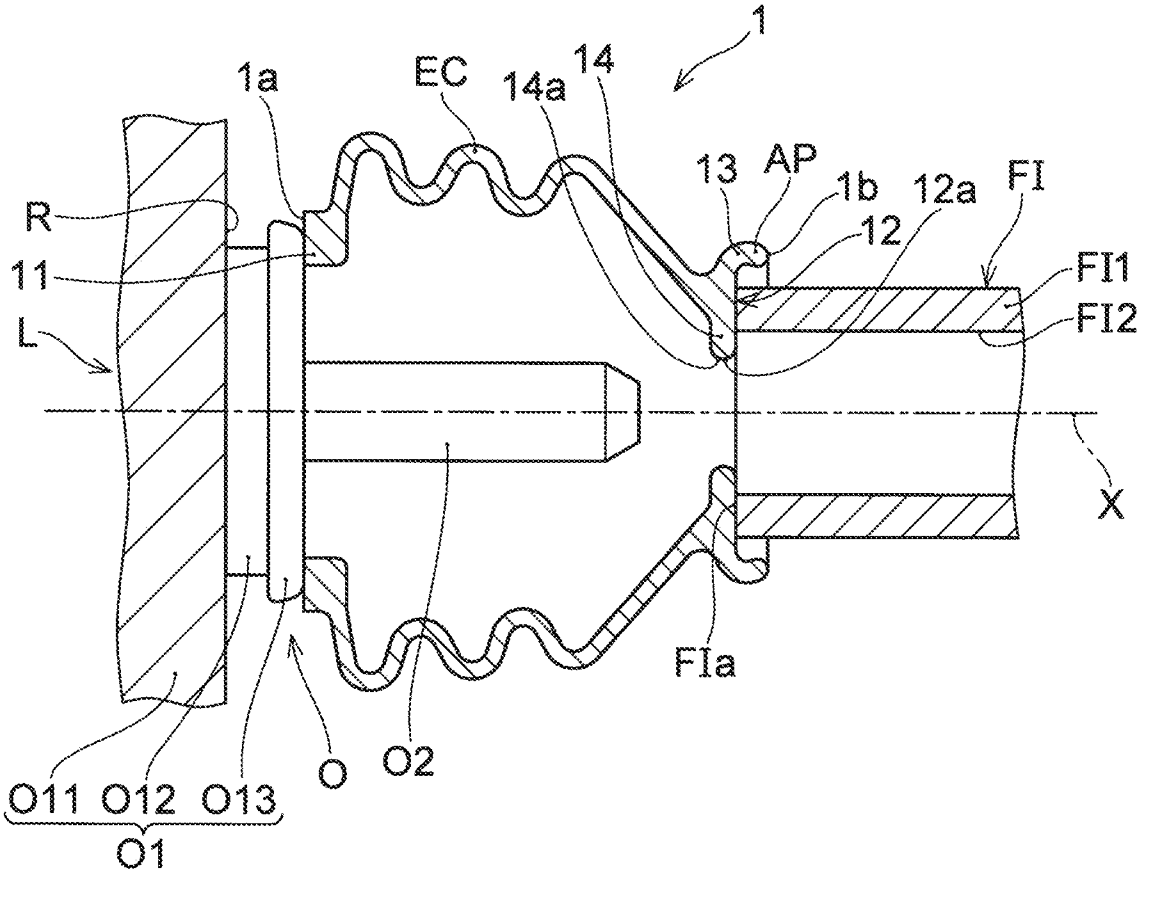
FIG. 10A is a cross-sectional view showing a state where, when the boot in FIG. 2 is mounted to a mounting portion of a mounting target object, a mounted portion of the boot abuts onto the mounting portion and a tip of a fluid injecting unit abuts onto an abutting portion of the boot.
Figure 10B:
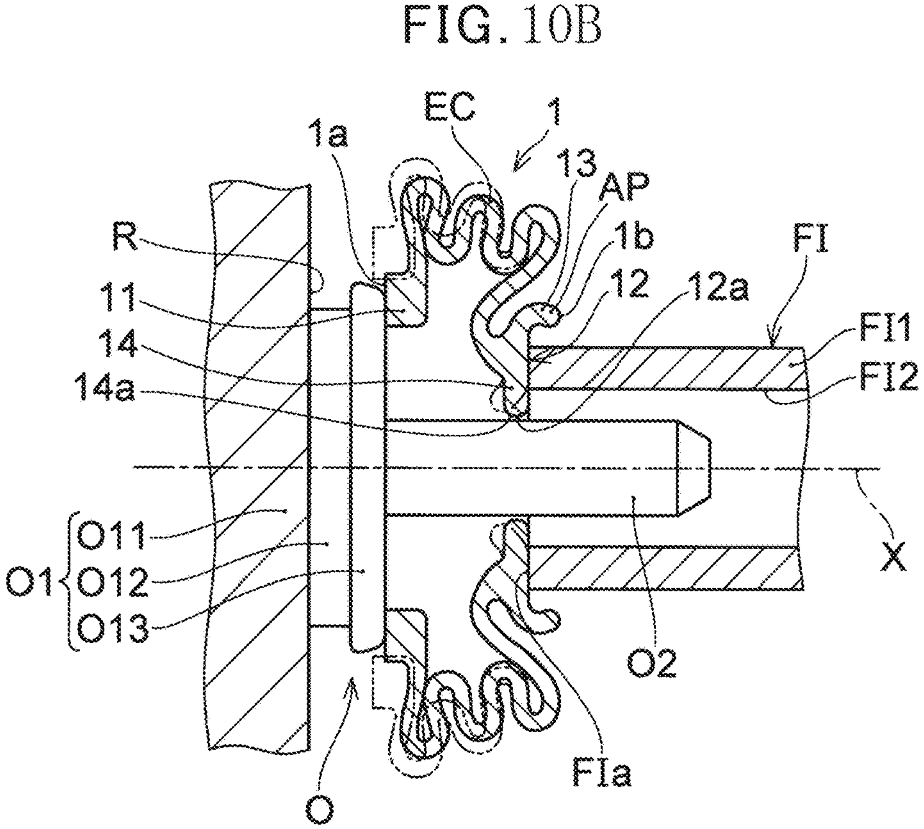
FIG. 10B is a cross-sectional view showing a state where the boot is contracted along the axis direction by being pressed by the tip of the fluid injecting unit from the state shown in FIG. 10A.
Figure 10C:
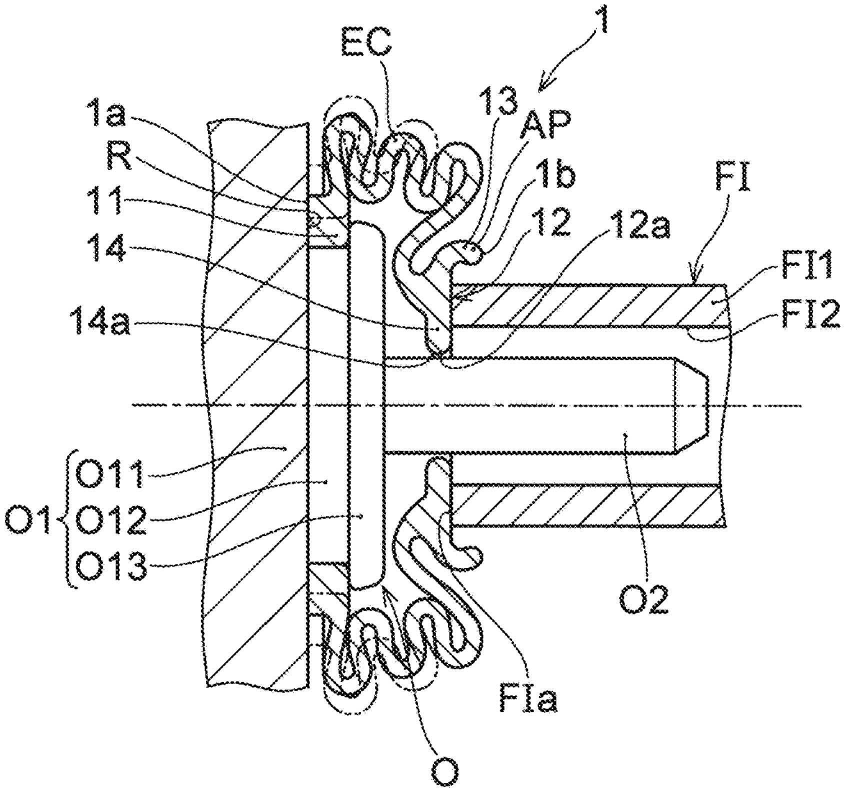
FIG. 10C is a cross-sectional view showing a state where the mounted portion reduces in diameter and is mounted to the mounting portion by fluid flowing out from the inside to the outside of the boot, from the state shown in FIG. 10B.

In the present embodiment, as shown in FIG. 1, the boot 1 is mounted to the lid L by mounting a mounted portion 11, which will be mentioned later, of the boot 1 to the mounting portion O1 of the mounting target object O. As shown in FIGS. 10A to 10C, the boot 1 is configured so that the boot 1 can be mounted to the mounting portion O1 of the mounting target object O by injecting fluid into the inside of the boot 1 by a fluid injecting unit FI. A mounting method will be mentioned in detail below, and therefore, an outline is explained here. When the boot 1 is mounted to the mounting portion O1, the boot 1 is first pressed along the axis X direction from the other end 1*b* side of the boot 1 by the fluid injecting unit FI so that the mounted portion 11 of the boot 1 abuts onto the mounting portion O1 along the axis X direction (see FIGS. 10A and 10B). A sealed space is formed inside the boot 1 by the mounted portion 11 of the boot 1 abutting onto the mounting portion O1. When fluid is injected into the inside of the boot 1 by the fluid injecting unit FI in this state, the diameter of the mounted portion 11 of the boot 1 enlarges due to a pressure of fluid (a state indicated by the two-dot chain line in FIG. 10B). The mounted portion 11 of the boot 1 having an enlarged diameter is moved to a mountable position (a position indicated by the two-dot chain line in FIG. 10C) where the mounted portion 11 can be mounted to the mounting portion O1, by being pressed toward the mounting portion O1 along the axis X direction. The mounted portion 11 of the boot 1 that has moved to the mountable position, by fluid flowing out from the inside to the outside of the boot 1, reduces in diameter and is mounted to the mounting portion O1 (a state indicated by the solid line in FIG. 10C).

As shown in FIG. 10A, the boot 1 that can be mounted to the mounting portion O1 of the mounting target object O in this way comprises an annular mounted portion 11 that is provided on one end 1*a* side in the axis X direction and is to be mounted to the mounting portion O1, an abutting portion 12 that is provided on an other end 1*b* side in the axis X direction and onto which a tip FIa of the fluid injecting unit FI can abut, and an extendable/contractible portion EC that extends along the axis X direction between the mounted portion 11 and the abutting portion 12 and is extendable and contractible in the axis X direction. The boot 1 is configured to be extendable and contractible in the axis X direction by the extendable/contractible portion EC extending and contracting in the axis X direction. In the present embodiment, the boot 1 is provided with an abutting end portion AP that can abut onto the base B of the mounting target M at the other end 1*b* of the boot 1.

The mounted portion 11 is a portion that is to be mounted to the mounting portion O1 of the mounting target object O, as shown in FIGS. 1, 10A to 10C. The mounted portion 11 is mounted to the mounting portion O1 so that the interface between the mounted portion 11 and the mounting portion O1 is sealed. Sealing here means that at least water, dust, etc. are suppressed from passing through. In the present embodiment, the mounted portion 11 is mounted to the mounting portion O1 by being fitted into the mounting portion O1. The mounted portion 11 is provided on the one end 1*a* side of the boot 1 in the axis X direction and connected to the extendable/contractible portion EC in the axis X direction. The mounted portion 11 is formed into an annular shape and constitutes an opening that communicates the internal space on the inner side in the radial direction of the boot 1 with the outside, on the one end 1*a* side of the boot 1. In the present embodiment, the opening at the one end 1*a* of the boot 1 is closed from the external environment by mounting the mounted portion 11 to the mounting portion O1 of the mounting target object O.

As shown in FIGS. 10B and 10C, the mounted portion 11 is configured so that the inner diameter of the mounted portion 11 is enlarged due to inflow of fluid into the inside of the boot 1 (a state indicated by the two-dot chain line in FIGS. 10B and 10C) and is reduced due to outflow of fluid from the inside to the outside of the boot 1 (a state indicated by the solid line in FIG. 10C). The inner diameter of the mounted portion 11 when enlarged is designed to have a size to allow the mounted portion 11 to move to a mountable position (a position indicated by the two-dot chain line in FIG. 10C) where the mounted portion 11 can be mounted to the mounting portion O1. When the boot 1 is mounted to the mounting portion O1 using the fluid injecting unit FI, the mounted portion 11 is enlarged in inner diameter by injecting fluid into the inside of the boot 1 by the fluid injecting unit FI, and the mounted portion 11 can move to the mountable position. Moreover, the inner diameter of the mounted portion 11 when reduced is designed to have a size so that the interface between the mounted portion 11 and the mounting portion O1 is sealed with the mounted portion 11 being mounted to the mounting portion O1. When the boot 1 is mounted to the mounting portion O1 using the fluid injecting unit FI, the enlarged diameter of the mounted portion 11 at the mountable position reduces as fluid that has flowed into the inside of the boot 1 flows outside (changes from the state indicated by the two-dot chain line to the state indicated by the solid line in FIG. 10C), and the mounted portion 11 is mounted to the mounting portion O1 so that the interface between the mounted portion 11 and the mounting portion O1 is sealed. It is to be noted that the inner diameter of the mounted portion 11 when enlarged as mentioned above does not necessarily need to be achieved not only by a pressure of fluid flowing into the inside of the boot 1, but may be achieved by also adding assistance of a human force to the pressure of fluid.

In the present embodiment, the inner diameter of the mounted portion 11 when reduced is designed to have a size that allows the mounted portion 11 to fit into the mounting portion O1. More specifically, as shown in FIGS. 1 and 10C, the inner diameter of the mounted portion 11 when reduced is designed to have a size that allows the mounted portion 11 to fit into the recessed portion R formed between the first large-diameter portion O11 and the second large-diameter portion O13 along the outer periphery of the small-diameter portion O12 of the mounting portion O1. For that purpose, the inner diameter of the mounted portion 11 when reduced is smaller than the outer diameter of the first and second large-diameter portions O11, O13 of the mounting portion O1, and is approximately equal to the outer diameter of the small-diameter portion O12 or slightly smaller or larger than the outer diameter of the small-diameter portion O12. With the mounted portion 11 being mounted to the mounting portion O1, the mounted portion 11 engages with the first and second large-diameter portions O11, O13 in the axis X direction, which restricts movement of the mounted portion 11 in the axis X direction, and the mounted portion 11 engages with the small-diameter portion O12 in the direction perpendicular to the axis X direction, which restricts movement of the mounted portion 11 in the direction perpendicular to the axis X direction. The mounted portion 11 comes into contact with at least one of the first large-diameter portion O11, the small-diameter portion O12, and the second large-diameter portion O13 of the mounted portion O1, thereby sealing the interface between the mounted portion 11 and the mounted portion O1.

In the present embodiment, the inner diameter of the mounted portion 11 when enlarged is designed to have a size that allows the mounted portion 11 to be removed from the mounting portion O1. More specifically, as indicated by the two-dot chain line in FIGS. 10B and 10C, the inner diameter of the mounted portion 11 when enlarged is designed to have a size that allows the mounted portion 11 to be extracted from the recessed portion R. For that purpose, the inner diameter of the mounted portion 11 when enlarged is larger than the outer diameter of any one of the first large-diameter portion O11 and the second large-diameter portion O13 of the mounting portion O1 (the second large-diameter portion O13 in the present embodiment). When the boot 1 is mounted to the mounting portion O1 using the fluid injecting unit FI, the mounted portion 11 can move along the axis X direction beyond the second large-diameter portion O13 to a position of the small-diameter portion O12 in the axis X direction (a mountable position) by being pressed toward the mounting portion O1 along the axis X direction with its inner diameter being enlarged, as indicated by the two-dot chain line in FIG. 10C.

The mounted portion 11 can be formed of an elastically deformable material such as rubber, synthetic resin, or the like, but is not particularly limited as long as the mounted portion 11 can be enlarged and reduced in inner diameter and is formed so that the boot 1 is suppressed from coming off from the mounting portion O1 even if the boot 1 is extended or contracted, in a state where the mounted portion 11 is mounted to the mounting portion O1 of the mounting target object O. Although the mounted portion 11 is connected to the extendable/contractible portion EC in the present embodiment, the mounted portion 11 may be formed as a part of the extendable/contractible portion EC.

As shown in FIG. 1, the abutting end portion AP is a portion that abuts onto the vehicle body B by the lid L approaching the vehicle body B that is a base when the boot 1 is used to be mounted to the lid opening/closing device M that is a mounting target. As shown in FIG. 2, the abutting end portion AP is provided at the other end 1*b* of the boot 1 in the axis X direction and connected to the abutting portion 12 in the axis X direction. The abutting end portion AP is formed into an annular shape and constitutes an opening that communicates the internal space on the inner side in the radial direction of the boot 1 with the outside, at the other end 1*b* of the boot 1. With the abutting end portion AP abutting onto the vehicle body B, the opening at the other end 1*b* of the boot 1 is closed from the external environment.

The abutting end portion AP can be formed of an elastically deformable material such as rubber, synthetic resin, or the like, without particular limitations, as long as the abutting end portion AP can abut onto the vehicle body B and is formed so that the abutting end portion AP is suppressed from being released from the abutting state onto the vehicle body B even if the boot 1 is extended and contracted. It is to be noted that, in the present embodiment, the abutting end portion AP is formed so as to function also as an axis misalignment-suppressing portion 13 (see FIGS. 2 and 10A) which will be mentioned later. However, the abutting end portion AP may be provided separately from the axis misalignment-suppressing portion 13. Further, the boot 1 does not necessarily have to comprise the abutting end portion AP, and the abutting portion 12 may constitute the other end 1*b* of the boot 1 and may be configured to abut onto the vehicle body B.

As shown in FIGS. 2 and 10A, the extendable/contractible portion EC is a portion that extends along the axis X direction between the mounted portion 11 and the abutting portion 12 and is extendable and contractible in the axis X direction. The extendable/contractible portion EC is formed into a hollow tubular shape extending along the axis X direction and is configured so that water, dust, etc. are suppressed from entering into an internal space formed on the inner side in the radial direction through a tubular wall portion. The extendable/contractible portion EC is connected to the mounted portion 11 on the one end 1*a* side of the boot 1 in the axis X direction and formed to include the abutting portion 12 on the other end 1*b* side of the boot 1 in the axis X direction. However, the extendable/contractible portion EC may be formed to include the mounted portion 11 on the one end 1*a* side of the boot 1 in the axis X direction and may be connected to the abutting portion 12 on the other end 1*b* side of the boot 1 in the axis X direction. The extendable/contractible portion EC can be formed of an elastically deformable material such as rubber, synthetic resin, or the like, without particular limitations, as long as the extendable/contractible portion EC can suppress water, dust, etc. from entering into the internal space and is extendable and contractible in the axis X direction. Details of the structure of the extendable/contractible portion EC will be mentioned later.

As shown in FIG. 10A, the abutting portion 12 is a portion that is provided on the other end 1*b* side in the axis X direction and onto which the tip FIa of the fluid injecting unit FI can abut toward the one end 1*a* side in the axis X direction along the axis X direction. Here, the fluid injecting unit FI that abuts onto the abutting portion 12 comprises a cylindrical wall portion FI1 and an outflow hole FI2 surrounded by the wall portion FI1. The fluid injecting unit FI is configured to cause fluid such as air and liquid to flow out from the tip FIa through the outflow hole FI2. The abutting portion 12 is configured so that the tip portion of the wall portion FI1 located at the tip Fla of the fluid injecting unit FI abuts onto the abutting portion 12.

As shown in FIG. 10A, the abutting portion 12 extends along the radial direction on the other end 1*b* side in the axis X direction of the boot 1, is formed into an annular shape along the direction around the axis X of the boot 1, and is provided, on the inner side in the radial direction of the abutting portion 12, with an opening 12*a* that allows fluid communication between an inside and an outside of the boot 1. The abutting portion 12 allows fluid to flow into the inside of the boot 1 from the fluid injecting unit FI through the opening 12*a* formed on the inner side in the radial direction of the abutting portion 12 in a state where the tip FIa of the fluid injecting unit FI abuts onto the abutting portion 12. The abutting portion 12 is configured so that the interface between the abutting portion 12 and the tip FIa of the fluid injecting unit FI is substantially sealed by the tip FIa of the fluid injecting unit FI abutting onto the abutting portion 12. Here, "substantially scaled" means that the boot 1 is scaled to such an extent that the boot 1 expands due to the inflow of fluid into the inside. The abutting portion 12, by being formed into an annular shape and extending along the radial direction, can more reliably enable the tip FIa of the fluid injecting unit FI to abut onto the abutting portion 12, and can more reliably suppress fluid from leaking from the interface between the tip FIa of the fluid injecting unit FI and the abutting portion 12 to the outside. In particular, the boot 1 is suppressed from extending in the axis X direction by receiving a reaction force from the tip FIa of the fluid injecting unit FI that abuts onto the abutting portion 12 along the axis X direction toward the one end 1*a* side of the boot 1 even if the boot 1 receives a force of expanding due to the pressure of fluid flowing into the inside. By extension of the boot 1 in the axis X direction being suppressed, expansion of the boot 1 in the radial direction is facilitated. The inner diameter of the mounted portion 11 of the boot 1 can be thereby enlarged more reliably, so that the mounted portion 11 can be easily moved to the mountable position. Accordingly, the boot 1 can be easily mounted to the mounting portion O1 of the mounting target object O.

It is to be noted that, in the present embodiment, as shown in FIG. 2, the abutting portion 12 is provided as a part of the extendable/contractible portion EC at the end of the extendable/contractible portion EC on the other end 1*b* side (an other end 3*b* of an extending portion 3 which will be mentioned later) of the boot 1. However, the abutting portion 12 may be connected to the end of the extendable/contractible portion EC, separately from the extendable/contractible portion EC, on the other end 1*b* side of the boot 1 with respect to the end of the extendable/contractible portion EC as long as the abutting portion 12 is provided on the other end 1*b* side of the boot 1.

The position of the abutting portion 12 in the radial direction provided on the boot 1 is not particularly limited as long as the abutting portion 12 is provided on the other end 1*b* side of the boot 1 in the axis X direction. In the present embodiment, the abutting portion 12 is arranged to extend to an inner side and an outer side in the radial direction of the boot 1, as shown in FIGS. 10A to 10C. More specifically, the abutting portion 12 is arranged to extend to both the inner side and the outer side in the radial direction from the end of the extendable/contractible portion EC on the other end 1*b* side of the boot 1 in the axis X direction. For example, in a case where the abutting portion 12 is provided as a part of the extendable/contractible portion EC, the abutting portion 12 is arranged to extend to both the inner side and the outer side in the radial direction from a part of the extendable/contractible portion EC located at the end of the abutting portion 12 on a side opposite to a side onto which the tip FIa of the fluid injecting unit FI abuts (for example, an end of a coupling portion 33 (see FIG. 2) of the extending portion 3, which will be mentioned later, on the other end 1*b* side of the boot 1). Alternatively, in a case where the abutting portion 12 is provided to be connected to the end of the extendable/contractible portion EC, the abutting portion 12 is arranged to extend to both the inner side and the outer side in the radial direction from a connection portion between the end of the abutting portion 12 and the end of the extendable/contractible portion EC in the axis X direction. With the abutting portion 12 being arranged to extend to the inner side and the outer side in the radial direction of the boot 1, the tip FIa of the fluid injecting unit FI can be made to abut onto the abutting portion 12 more reliably, even if the diameter of the tip portion of the wall portion FI1 of the fluid injecting unit FI, and the diameter of the part of the extendable/contractible portion EC located at the end of the abutting portion 12 or the diameter of the connecting portion between the end of the abutting portion 12 and the end of the extendable/contractible portion EC differ from each other more or less, or even if the axis of the fluid injecting unit FI is misaligned from the axis X of the boot 1 more or less.

The structure of the abutting portion 12 is not particularly limited as long as the abutting portion 12 extends along the radial direction of the boot 1, is formed into an annular shape along the direction around the axis of the boot 1, and is provided with an opening 12*a* on the inner side in the radial direction. In the present embodiment, the abutting portion 12 is formed into a plate shape deformable in the axis X direction, as shown in FIGS. 10A to 10C. With the abutting portion 12 being formed into a plate shape deformable in the axis X direction, when fluid is injected into the inside of the boot 1 from the tip FIa of the fluid injecting unit FI, the abutting portion 12 bends to the inside in the axis X direction of the boot 1 due to an injection pressure of fluid (a state indicated by the two-dot chain line in FIG. 10B), making it easy for fluid to be guided into the inside of the boot 1. Fluid can be thereby easily injected into the inside of the boot 1, so that the inner diameter of the mounted portion 11 of the boot 1 can be more easily enlarged, and the mounted portion 11 can be more easily moved to the mountable position. Accordingly, the boot 1 can be more easily mounted to the mounting portion O1 of the mounting target object O.

As shown in FIGS. 10A to 10C, the boot 1 may comprise, on the outer periphery of the abutting portion 12 in the radial direction, an axis misalignment-suppressing portion 13 that suppresses axis misalignment of the tip FIa of the fluid injecting unit FI relative to the opening 12*a* when the tip FIa of the fluid injecting unit FI abuts onto the abutting portion 12. Here, axis misalignment means that the tip FIa of the fluid injecting unit FI moves relative to the abutting portion 12 beyond the outer periphery of the abutting portion 12 in the radial direction toward a direction perpendicular to the axis X direction. With the boot 1 comprising the axis misalignment-suppressing portion 13, the axis misalignment of the tip FIa of the fluid injecting unit FI is suppressed, so that fluid can be injected into the inside of the boot 1 more reliably. Further, with the axis misalignment of the tip Fla of the fluid injecting unit FI being suppressed, a force along the axis X direction is applied to the boot 1 when the abutting portion 12 is pressed by the tip FIa of the fluid injecting unit FI, so that the boot 1 is suppressed from inclining with respect to an abutting direction of the boot 1 onto the mounting portion O1. If the axis misalignment of the tip FIa of the fluid injecting unit FI occurs and the boot 1 is pressed by the fluid injecting unit FI in the inclined state, there is a possibility that a situation may arise in which only a part of the mounted portion 11 of the boot 1 in a circumferential direction moves to the mountable position, but other parts of the mounted portion 11 of the boot 1 in the circumferential direction cannot move to the mountable position. With the inclining of the boot 1 being suppressed, the mounted portion 11 of the boot 1 can be moved almost uniformly to the mountable position over its entire circumference, so that the boot 1 can be mounted to the mounting portion O1 of the mounting target object O more reliably.

The structure of the axis misalignment-suppressing portion 13 is not particularly limited as long as the axis misalignment-suppressing portion 13 can suppress the axis misalignment of the tip FIa of the fluid injecting unit FI. In the present embodiment, the axis misalignment-suppressing portion 13 extends along the axis X direction from the outer periphery of the abutting portion 12 in the radial direction toward the other end 1*b* of the boot 1 and is formed into an annular shape over the entire outer periphery of the abutting portion 12 in the radial direction, as shown in FIGS. 10A to 10C. Thereby, the axial misalignment of the tip FIa of the fluid injecting unit FI in all directions perpendicular to the axis X direction is suppressed. However, the axis misalignment-suppressing portion 13 may be provided on a part of the outer periphery of the abutting portion 12 in the radial direction, not on the entire outer periphery of the abutting portion 12 in the radial direction. In the present embodiment, the axis misalignment-suppressing portion 13 is provided so as to function also as the abutting end portion AP, but may be provided separately from the abutting end portion AP.

Here, in the present embodiment, as mentioned above, the mounting target object O has an extension portion O2 that extends along the axis X direction in at least a part of the inside of the boot 1 when the boot 1 is mounted to the mounting target object O, as shown in FIGS. 10A to 10C. In the present embodiment, the extension portion O2 is a member having a function of pressing the operation portion OP in order to operate the operation portion OP, as shown in FIG. 1. However, the extension portion is not limited to such a member, and the extension portion may be an other member such as a cable extending in the axis direction in a case where the mounting target for the boot is a connection mechanism of a control cable or the like. Further, in the present embodiment, the extension portion O2 extends over a part of the boot 1 in the axis X direction, in an extended state having a natural length of the boot 1 (a state in FIG. 10A), but the extension portion may extend over the entire boot 1 in the axis X direction or may extend to the outside of the boot 1.

As shown in FIGS. 10A to 10C, the boot 1 may comprise a guiding portion 14 that guides the extension portion O2 of the above-mentioned mounting target object O so as to extend and contract along the axis X direction with respect to the extension portion O2. The guiding portion 14 extends to the inner side in the radial direction from an inner circumference of the boot 1, is formed into an annular shape along the direction around the axis X of the boot 1, and is provided, on the inner side in the radial direction of the guiding portion 14, with an insertion hole 14*a* through which the extension portion O2 can be inserted. When the boot 1 extends and contracts along the axis X direction, the guiding portion 14 guides the extension portion O2 along the axis X direction through the insertion hole 14*a*, so that the boot 1 is suppressed from displacing in a direction perpendicular to a direction in which the extension portion O2 extends (the axis X direction). Thereby, when the boot 1 is contracted by being pressed by the tip FIa of the fluid injecting unit FI, the boot 1 is suppressed from misaligning in a direction perpendicular to the abutting direction of the boot 1 onto the mounting portion O1 and suppressed from inclining with respect to the abutting direction of the boot 1 onto the mounting portion O1. Accordingly, the mounted portion 11 of the boot 1 can be moved almost uniformly to the mountable position over its entire circumference, so that the boot 1 can be mounted to the mounting portion O1 of the mounting target object O more reliably.

The structure of the guiding portion 14 is not particularly limited as long as the guiding portion 14 extends from the inner circumference of the boot 1 to the inner side in the radial direction, is formed into an annular shape along the direction around the axis of the boot 1, and is provided with an insertion hole 14*a* on the inner side in the radial direction. In the present embodiment, the guiding portion 14 is formed into a plate shape deformable in the axis X direction, as shown in FIGS. 10A to 10C. With the guiding portion 14 being formed into a plate shape deformable in the axis X direction, when fluid is injected into the inside of the boot 1 from the tip FIa of the fluid injecting unit FI, the guiding portion 14 bends to the inside in the axis X direction of the boot 1 due to an injection pressure of fluid (a state indicated by the two-dot chain line in FIG. 10B), making it easy for fluid to be guided into the inside of the boot 1. Fluid can be thereby easily injected into the inside of the boot 1, so that the inner diameter of the mounted portion 11 of the boot 1 can be more easily enlarged, and the mounted portion 11 can be more easily moved to the mountable position. Accordingly, the boot 1 can be more easily mounted to the mounting portion O1 of the mounting target object O.

The position in the axis X direction where the guiding portion 14 is located is not particularly limited as long as the guiding portion 14 is provided so as to extend from the inner circumference of the boot 1 to the inner side in the radial direction. In the present embodiment, the guiding portion 14 is provided as a part of the abutting portion 12 on the other end 1*b* side of the boot 1, as shown in FIGS. 10A to 10C. The insertion hole 14*a* provided on the inner side in the radial direction of the guiding portion 14 constitutes an opening 12*a* provided on the inner side in the radial direction of the abutting portion 12. At least a part of the abutting portion 12 is provided on a surface of the guiding portion 14 on the other end 1*b* side in the axis X direction. The guiding portion 14 is provided at a portion onto which the tip FIa of the fluid injecting unit FI abuts, so that the guiding portion 14 directly resists a force in a direction perpendicular to the axis X direction that may be received from the tip FIa of the fluid injecting unit FI and can suppress the other end 1*b* of the boot 1 from being displaced in a direction perpendicular to the abutting direction of the boot 1 onto the mounting portion O1. Thereby, more reliably, the boot 1 is suppressed from misaligning in the direction perpendicular to the abutting direction of the boot 1 onto the mounting portion O1 and suppressed from inclining with respect to the abutting direction of the boot 1 onto the mounting portion O1.

Moreover, when the boot 1 is contracted by being pressed by the tip FIa of the fluid injecting unit FI, the guiding portion 14 slidingly contacts the extension portion O2 if the boot 1 attempts to misalign in the direction perpendicular to the abutting direction of the boot 1 onto the mounting portion O1, so that the guiding portion 14 is applied with a force of causing the guiding portion 14 to bend to a side opposite to a pressing direction of the fluid injecting unit FI (the right side in FIGS. 10A to 10C). However, the guiding portion 14 formed as a part of the abutting portion 12 receives a pressing force in the pressing direction of the fluid injecting unit FI by the fluid injecting unit FI, so that the guiding portion 14 is suppressed from bending to the side opposite to the pressing direction of the fluid injecting unit FI. Thereby, more reliably, the guiding portion 14 can guide the extension portion O2, and the boot 1 is suppressed from misaligning in the direction perpendicular to the abutting direction of the boot 1 onto the mounting portion O1 and suppressed from inclining with respect to the abutting direction of the boot 1 onto the mounting portion O1. Conversely, when fluid is injected into the inside of the boot 1 from the tip FIa of the fluid injecting unit FI, as mentioned above, the guiding portion 14 bends to the inside in the axis X direction of the boot 1 due to the injection pressure of fluid, making it easy for fluid to be guided into the inside of the boot 1. It is to be noted that the guiding portion 14 may be provided on the inner side of the boot 1 in the axis X direction with respect to the abutting portion 12, separately from the abutting portion 12.

Next, with reference to FIGS. 10A to 10C, a method of mounting the boot 1 to the mounting portion O1 of the mounting target object O using the fluid injecting unit FI will be described. However, the following mounting method is an example, and the method of mounting the boot 1 to the mounting portion O1 is not limited to the following example. Further, although some procedures will be described below, an order of the procedures is not limited to the following order of description below.

First, as shown in FIG. 10A, the boot 1 is arranged so that the one end 1*a* of the boot 1 abuts onto the mounting portion O1 along the axis X direction. At this time, the mounted portion 11 provided on the one end 1*a* side of the boot 1 abuts onto one surface of the second large-diameter portion O13 of the mounting portion O1 in the axis X direction (surface on the right side in FIG. 10A). Moreover, the fluid injecting unit FI is arranged so that the tip FIa of the fluid injecting unit FI abuts onto the abutting portion 12 toward the one end 1*a* side of the boot 1 along the axis X direction. With the mounted portion 11 on the one end 1*a* side of the boot 1 abutting onto the mounting portion O1, the interface between the mounted portion 11 and the mounting portion O1 is substantially sealed, and with the tip FIa of the fluid injecting unit FI abutting onto the abutting portion 12 on the other end 1*b* side of the boot 1, the interface between the abutting portion 12 and the tip FIa of the fluid injecting unit FI is substantially sealed. A substantially sealed space is thereby formed inside the boot 1.

Next, as shown in FIG. 10B, the boot 1 is pressed along the axis X direction from the other end 1*b* side toward the one end 1*a* side of the boot 1 by the tip FIa of the fluid injecting unit FI, so that the boot 1 contracts along the axis X direction. At this time, with the boot 1 comprising a guiding portion 14, the boot 1 is suppressed from misaligning in the direction perpendicular to the abutting direction of the boot 1 onto the mounting portion O1 and suppressed from inclining from the abutting direction of the boot 1 onto the mounting portion O1. Subsequently, with the boot 1 being pressed by the tip FIa of the fluid injecting unit FI, fluid is injected from the tip FIa of the fluid injecting unit FI into the inside of the boot 1, so that the inner diameter of the mounted portion 11 provided on the one end 1*a* side of the boot 1 enlarges (the state indicated by the two-dot chain line in FIG. 10B). The mounted portion 11 having the enlarged inner diameter is moved in a direction away from the other end 1*b* of the boot 1 along the axis X direction to the mountable position where the mounted portion 11 can be mounted to the mounting portion O1 (the position indicated by the two-dot chain line in FIG. 10C) by a pressing force by the tip FIa of the fluid injecting unit FI and/or a pressure of fluid inside the boot 1. At this time, the mounted portion 11 having the enlarged diameter moves along the axis X direction beyond a position of the second large-diameter portion O13 of the mounting portion O1 to a position of the small-diameter portion O12 of the mounting portion O1 and abuts onto the first large-diameter portion O11 of the mounting portion O1 to stop.

Finally, as shown in FIG. 10C, as fluid flows from the inside to the outside of the boot 1, the enlarged inner diameter of the mounted portion 11 reduces (changes from the state indicated by the two-dot chain line to the state indicated by the solid line in FIG. 10C), and the mounted portion 11 is mounted to the mounting portion O1. At this time, the mounted portion 11 is fitted into the recessed portion R formed between the first large-diameter portion O11 and the second large-diameter portion O13 along the outer periphery of the small-diameter portion O12, so that the mounted portion 11 is mounted to the mounting portion O1. When the pressing force by the tip FIa of the fluid injecting unit FI is released, the boot 1 extends in the axis X direction to complete mounting to the mounting portion O1 (the state indicated by the two-dot chain line in FIG. 1).

Next, details of the structure of the extendable/contractible portion EC will be described. However, the extendable/contractible portion EC is not limited to the structure described below as long as the extendable/contractible portion EC extends along the axis X direction between the mounted portion 11 and the abutting portion 12, and is configured to be extendable and contractible in the axis X direction, as shown in FIG. 2.

In the present embodiment, as shown in FIG. 2, the extendable/contractible portion EC comprises a bellows portion 2 alternately having a bellows portion-side peak portion 21 and a bellows portion-side valley portion 22 along the axis X direction, and an extending portion 3 connected adjacent to the bellows portion 2 in the axis direction and provided adjacent to the other end 1*b* of the boot 1 in the axis direction.

As shown in FIG. 2, the bellows portion 2 is a portion that is formed into a hollow tubular shape extending along the axis X direction between one end 2*a* and an other end 2*b* and is configured to be extendable and contractible in the axis X direction. The one end 2*a* of the bellows portion 2 is directly or indirectly (directly in the present embodiment) connected to the mounted portion 11, and the other end 2*b* of the bellows portion 2 is directly or indirectly (directly in the present embodiment) connected to one end 3*a* of the extending portion 3. Although the bellows portion 2 is formed integrally with the mounted portion 11 and the extending portion 3 in the present embodiment, the bellows portion 2 may be formed separately from the mounted portion 11 and the extending portion 3. When the boot 1 is used to be mounted to the lid opening/closing device M that is a mounting target, the bellows portion 2 is compressed as the boot 1 is compressed between the lid L and the vehicle body B, and the bellows portion 2 extends as the boot 1 extends by the lid L being separated from the vehicle body B. Although the bellows portion 2 is formed into a tubular shape with a circular cross section perpendicular to the axis X direction in the present embodiment, the bellows portion 2 may be formed into another tubular shape with a square cross section, etc. Further, the bellows portion 2 can be formed of an elastically deformable material such as rubber, synthetic resin, or the like, without particular limitations, as long as the bellows portion 2 is extendable and contractible in the axis X direction.

As shown in FIG. 2, the bellows portion 2 has a bellows-like shape in which an annular bellows portion-side peak portion 21 that protrudes toward an outer side in a radial direction and an annular bellows portion-side valley portion 22 that is recessed toward an inner side in the radial direction are alternately formed along the axis X direction of the boot 1. The bellows portion-side peak portion 21 and the bellows portion-side valley portion 22 are arranged alternately and continuously in the axis X direction, thereby constituting a wall portion of the bellows portion 2. In the bellows portion 2, water, dust, etc. are suppressed from entering into an internal space formed on the inner side in the radial direction through the wall portion constituted by the bellows portion-side peak portion 21 and the bellows portion-side valley portion 22. When the boot 1 is used to be mounted to the lid opening/closing device M that is a mounting target, the extension portion O2 of the mounting target object O is arranged in the internal space on the inner side in the radial direction of the bellows portion 2 when the boot 1 is mounted to the mounting target object O of the lid L, as shown in FIG. 1. It is to be noted that, in the present embodiment, the bellows portion 2 comprises two bellows portion-side peak portions 21 and two bellows portion-side valley portions 22, but the number of each of them is not particularly limited as long as the bellows portion 2 comprises at least one bellows portion-side peak portion 21 and at least one bellows portion-side valley portion 22 so that the bellows portion 2 is extendable and contractible in the axis X direction, and the bellows portion 2 may comprise three or more bellows portion-side peak portions 21 and three or more bellows portion-side valley portions 22. Moreover, the bellows portion 2 may comprise any structure other than the bellows portion-side peak portion 21 and the bellows portion-side valley portion 22, such as a coupling portion that couples the bellows portion-side peak portion 21 and the bellows portion-side valley portion 22, as long as the bellows portion 2 comprises at least one bellows portion-side peak portion 21 and at least one bellows portion-side valley portion 22.

As shown in FIG. 2, the extending portion 3 is a portion that is formed into a hollow tubular shape extending along the axis X direction between the one end 3*a* and the other end 3*b* and is configured to be extendable and contractible in the axis X direction. The one end 3*a* of the extending portion 3 is directly or indirectly (directly in the present embodiment) connected to the other end 2*b* of the bellows portion 2, and the other end 3*b* of the extending portion 3 is formed to include the abutting portion 12 or directly or indirectly connected to the abutting portion 12 (formed to include the abutting portion 12 in the present embodiment). Although the extending portion 3 is formed integrally with the bellows portion 2 and the abutting portion 12 in the present embodiment, the extending portion 3 may be formed separately from the bellows portion 2 and the abutting portion 12. Moreover, although the extending portion 3 is connected to the other end 2*b* of the bellows portion 2 and provided adjacent to the other end 1*b* of the boot 1 in the present embodiment, the extending portion 3 may be connected to the one end 2*a* of the bellows portion 2 and provided adjacent to the one end 1*a* of the boot 1, or may be connected to the one end 2*a* and the other end 2*b* of the bellows portion 2 on both sides thereof across the bellows portion 2 in the axis X direction and provided adjacent to the one end 1*a* and the other end 1*b* of the boot 1. When the boot 1 is used to be mounted to the lid opening/closing device M that is a mounting target, the extending portion 3 is compressed as the boot 1 is compressed between the lid L and the vehicle body B, and the extending portion 3 extends as the boot 1 extends by the lid L being separated from the vehicle body B. Although the extending portion 3 is formed into a tubular shape with a circular cross section perpendicular to the axis X direction in the present embodiment, the extending portion 3 may be formed into another tubular shape with a square cross section, etc. Moreover, a constituent material of the extending portion 3 is not particularly limited as long as the extending portion 3 is extendable and contractible in the axis X direction, and the extending portion 3 can be formed of an elastically deformable material such as rubber, synthetic resin, or the like.

In the present embodiment, the extending portion 3 is configured so that a restoring force of the extending portion 3 in the axis X direction is smaller than that of the bellows portion 2 in the axis X direction when the boot 1 is in the compressed state. In this case, compared to a case where the entire boot 1 is formed of only a bellows portion 2, an increase of a restoring force of the entire boot 1 in the axis X direction, which is caused by compression of the boot 1, can be suppressed. In a case where the boot 1 is applied to the lid opening/closing device M, by suppressing the increase of the restoring force in the axis X direction, which is caused by compression of the boot 1, the lid L is suppressed from being pressed by the restoring force of the boot 1 and lifting off of a surface of the vehicle body when the lid L is in the closed position.

Figure 3A:
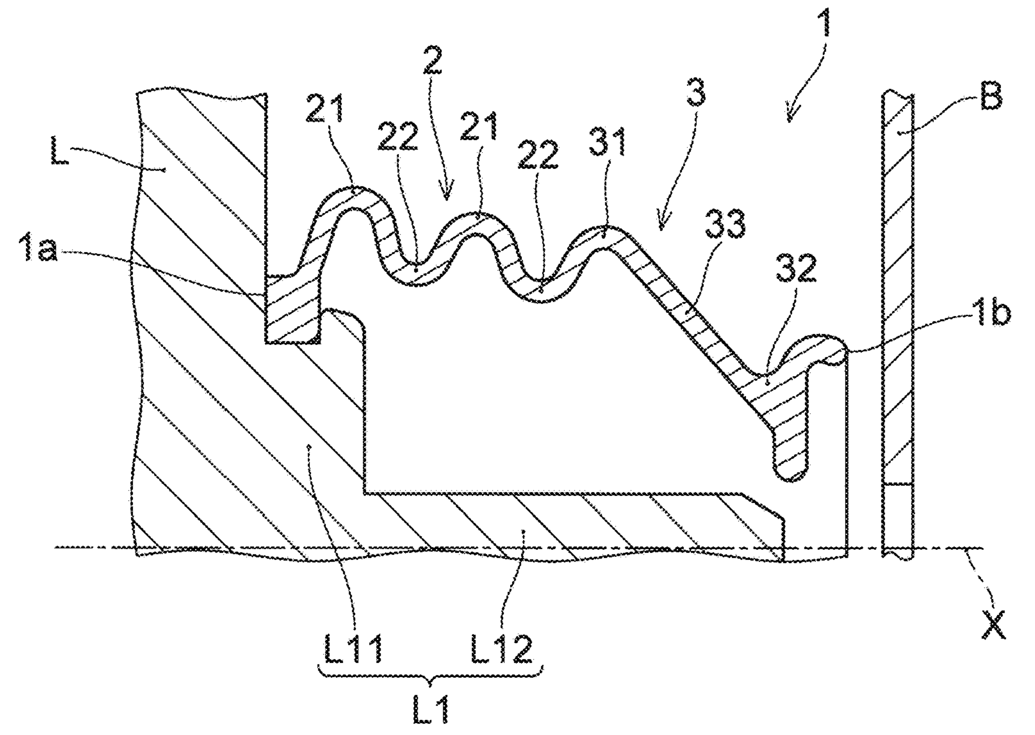
FIG. 3A is a partial sectional view of the lid opening/closing device of FIG. 1 in a state where the lid is in an opened position.
Figure 3B:
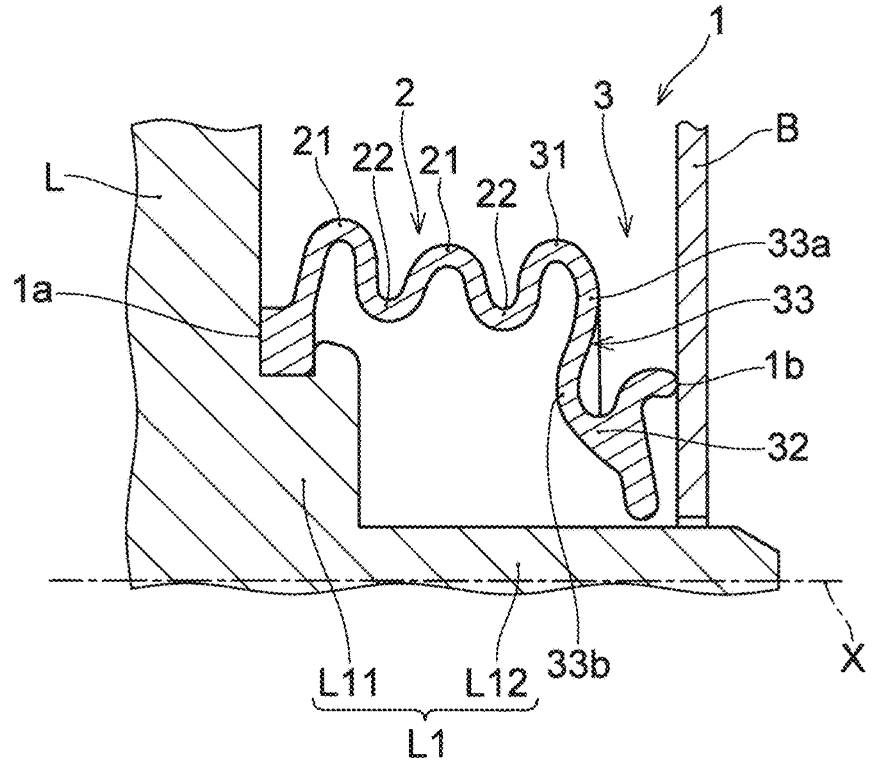
FIG. 3B is a partial sectional view of the lid opening/closing device in a state where the lid approaches a vehicle body from the state shown in FIG. 3A.
Figure 3C:
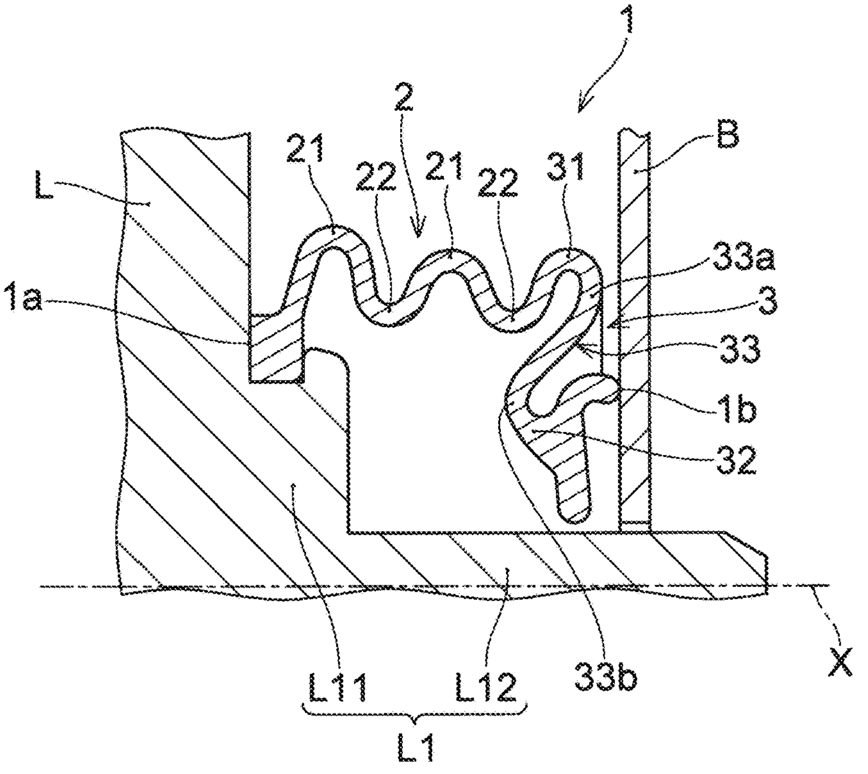
FIG. 3C is a partial sectional view of the lid opening/closing device in a state where the lid further approaches the vehicle body to be in a closed position from the state shown in FIG. 3B.
Figure 3D:
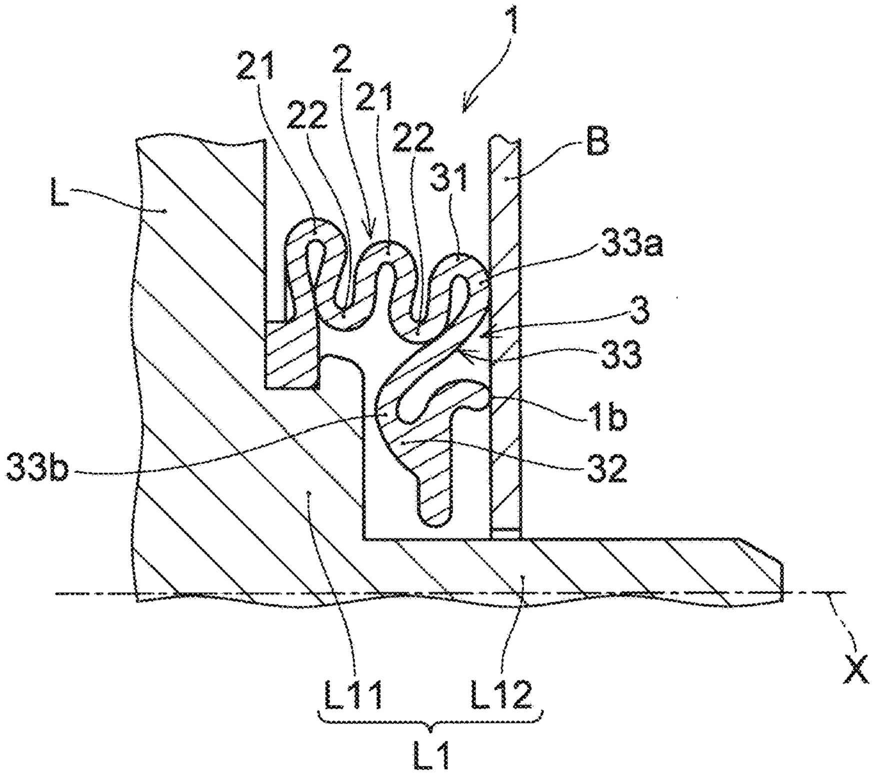
FIG. 3D is a partial sectional view of the lid opening/closing device in a state where the lid further approaches the vehicle body to be in an advanced position from the state shown in FIG. 3C.

The shape of the extending portion 3 is not particularly limited as long as the extending portion 3 is configured so that the restoring force of the extending portion 3 in the axis X direction is smaller than that of the bellows portion 2 in the axis X direction when the boot 1 is in the compressed state. In the present embodiment, as shown in FIG. 2, the extending portion 3 is formed so that an outer diameter OD1 of an end of the extending portion 3 on a side (other end 3*b* in the present embodiment) opposite to a side (one end 3*a* side in the present embodiment) connected to the bellows portion 2 in the axis X direction is smaller than an inner diameter ID of the bellows portion-side valley portion 22 of the bellows portion 2. As shown in FIGS. 3C to 3D, the extending portion 3 is configured so that at least a part of the extending portion 3 is displaced into the bellows portion 2 (position on the inner side in the radial direction) when the boot 1 is compressed in the axis X direction. By configuring the extending portion 3 in this way, the restoring force of the extending portion 3 in the axis X direction can be made smaller than that of the bellows portion 2 even if thicknesses of members constituting the respective bellows portion 2 and the extending portion 3 are made almost the same. This is because, as will be described in detail below, when the extending portion 3 is compressed in the axis X direction and at least a part thereof is displaced into the bellows portion 2, the extending portion 3 is curved so as to overlap in the radial direction, so that the restoring force in the radial direction increases, but the restoring force in the axis X direction does not increase as much as the restoring force in the radial direction does.

For example, the restoring force of the boot can be reduced by making the boot thinner, but the thinning deteriorates durability, and there is a possibility that the boot may be damaged depending on handling during transportation or use. Moreover, if the boot is thickened conversely, the boot length when compressed becomes long, and if the boot is compressed to shorten the boot length, the restoring force becomes large. Therefore, it is difficult to apply the boot to a location where a boot installation space is small, like a refueling or power-supplying space of the lid opening/closing device M, and even if the boot can be applied to the lid opening/closing device M, a reaction force (restoring force) acting on the lid L becomes large, and the surface of the lid L lifts up with respect to a surface of a vehicle body around the lid L, creating a step between the surface of the lid L and the surface of the vehicle body around the lid L, which may impair the design.

In the present embodiment, the extending portion 3 is configured so that at least a part of the extending portion 3 is displaced into the bellows portion 2 when the boot 1 is compressed in the axis X direction, so that the restoring force can be made small without thinning the extending portion 3, and therefore, deterioration in durability and reduction in strength due to the thinning can be suppressed. Furthermore, by making the restoring force of the extending portion 3 in the axis X direction smaller than that of the bellows portion 2, the restoring force of the entire boot 1 in the axis X direction can be made small, so that, as mentioned above, when the lid L is in the closed position, the lid L is suppressed from being pressed by the reaction force (restoring force) of the boot 1 and lifting off of the surface of the vehicle body. In addition, when the boot 1 is compressed, at least a part of the extending portion 3 is displaced into the bellows portion 2, so that the boot length of the boot 1 when compressed can be shortened while suppressing an increase of the restoring force caused by the compression, when compared with a case where the entire boot 1 is formed of only a bellows portion 2. Therefore, when the boot 1 is applied to the lid opening/closing device M, the boot length of the boot 1 when compressed can be shortened, so that the boot 1 can also be accommodated in a narrow refueling or power-supplying space between the lid L and the vehicle body B.

The structure of the extending portion 3 is not particularly limited as long as the extending portion 3 is configured so that at least a part of the extending portion 3 is displaced into the bellows portion 2 when the boot 1 is compressed in the axis X direction. In the present embodiment, as shown in FIG. 2, the extending portion 3 comprises an extending portion-side peak portion 31 provided adjacent to the bellows portion 2, an extending portion-side valley portion 32 provided adjacent to the one end 1*a* and/or the other end 1*b* (the other end 1*b* in the present embodiment) of the boot 1 in the axis X direction, and a coupling portion 33 that couples the extending portion-side peak portion 31 and the extending portion-side valley portion 32. The extending portion-side peak portion 31 protrudes to the outside in the radial direction to be formed into an annular shape, and the extending portion-side valley portion 32 is recessed to the inside in the radial direction to be formed into an annular shape. Moreover, the coupling portion 33 is formed into a tubular shape extending along the axis X direction while reducing in diameter from the extending portion-side peak portion 31 toward the extending portion-side valley portion 32. In the present embodiment, the extending portion 3 is provided with one extending portion-side peak portion 31, one extending portion-side valley portion 32, and one coupling portion 33. As shown in FIGS. 3C and 3D, the coupling portion 33 is configured so that at least a part of the coupling portion 33 is displaced into the bellows portion 2 (position on the inner side in the radial direction) when the boot 1 is compressed in the axis X direction. With the extending portion-side peak portion 31 being provided adjacent to the bellows portion 2 and the extending portion-side valley portion 32 being provided adjacent to the one end 1*a* and/or the other end 1*b* (the other end 1*b* in the present embodiment) of the boot 1, the coupling portion 33 becomes easy to curve to the inside in the radial direction when the boot 1 is compressed. This eliminates the need to secure an excess space for the extending portion 3 to curve to the outside in the radial direction of the boot 1.

The size of the extending portion 3 is not particularly limited as long as the extending portion 3 is configured so that at least a part of the extending portion 3 is displaced into the bellows portion 2 when the boot 1 is compressed in the axis X direction. In the present embodiment, as shown in FIG. 2, the extending portion 3 is formed so that a length D1 in the axis X direction between the extending portion-side peak portion 31 and the extending portion-side valley portion 32 is longer than a length D2 in the axis X direction between the bellows portion-side peak portion 21 and the bellows portion-side valley portion 22. Thereby, when the boot 1 is compressed, the coupling portion 33 can be easily deformed while suppressing the bellows portion 2 from deforming to the outside in the radial direction, so that at least a part of the coupling portion 33 can be easily displaced into the bellows portion 2. The fact that at least a part of the coupling portion 33 can be easily displaced into the bellows portion 2 can suppress an increase of the restoring force of the extending portion 3 in the axis X direction.

Moreover, in the present embodiment, the extending portion 3 is formed so that an outer diameter OD2 of the extending portion-side peak portion 31 is smaller than an outer diameter OD3 of the bellows portion-side peak portion 21, as shown in FIG. 2. Thereby, for example, in the case where the boot 1 is applied to the lid opening/closing device M that is a mounting target, when the boot 1 is compressed, the extending portion-side peak portion 31 can be suppressed from abutting onto the vehicle body B that is a base, so that the boot length of the boot 1 when compressed can be made shorter, as shown in FIG. 3C.

The extending portion 3 may be formed so as to have a higher rigidity in the extending portion-side valley portion 32 than in other parts of the extending portion 3. By increasing the rigidity of the extending portion-side valley portion 32, deformation of the extending portion-side valley portion 32 is suppressed when the boot 1 is compressed, and accordingly, curvature of the coupling portion 33 is facilitated, so that the coupling portion 33 becomes easy to enter the inside of the bellows portion 2. Moreover, as deformation of the extending portion-side valley portion 32 is suppressed, deformation of the one end 1*a* and/or the other end 1*b* (the other end 1*b* in the present embodiment) of the boot 1 in the axis X direction adjacent to the extending portion-side valley portion 32 is also suppressed, so that an axis of an opening at the one end 1*a* and/or the other end 1*b* of the boot 1 is suppressed from inclining. Thereby, for example, when the boot 1 is used to be mounted to the mounting target M, an abutting surface of the one end 1*a* and/or the other end 1*b* of the boot 1 onto the base B is suppressed from lifting, and water, dust, etc. are suppressed from entering through the opening at the one end 1*a* and/or the other end 1*b* of the boot 1.

For the purpose of increasing the rigidity of the extending portion-side valley portion 32, for example, as shown in FIG. 2, the extending portion-side valley portion 32 may be provided with a tongue piece portion 34 that extends to the inside in the radial direction from the extending portion-side valley portion 32 and is formed into an annular shape along a direction around the axis X of the extending portion-side valley portion 32. With the extending portion-side valley portion 32 adjacent to the one end 1*a* and/or the other end 1*b* (the other end 1*b* in the present embodiment) of the boot 1 being provided with the tongue piece portion 34 that extends to the inside in the radial direction, the size of the opening at the one end 1*a* and/or the other end 1*b* of the boot 1 can be made small, so that water, dust, etc. can be further suppressed from entering through the opening at the one end 1*a* and/or the other end 1*b* of the boot 1. It is to be noted that, in the present embodiment, the tongue piece portion 34 is formed as a part of the abutting portion 12 and also formed so as to function as a guiding portion 14. However, the tongue piece portion 34 may be provided separately from the abutting portion 12 and the guiding portion 14.

Next, with reference to FIGS. 3A to 3D and FIG. 4, an extending/contracting operation of the boot 1 will be described. The extending/contracting operation of the boot 1 will be described below by taking as an example a case where the boot 1 is applied to the lid opening/closing device M that is a mounting target, but the boot of the present invention is not limited to the following example and can also be applied to other applications. Moreover, the extending/contracting operation of the boot 1, which will be described below, is merely an example, and the extending/contracting operation of the boot of the present invention is not limited to the following example.

Figure 4:
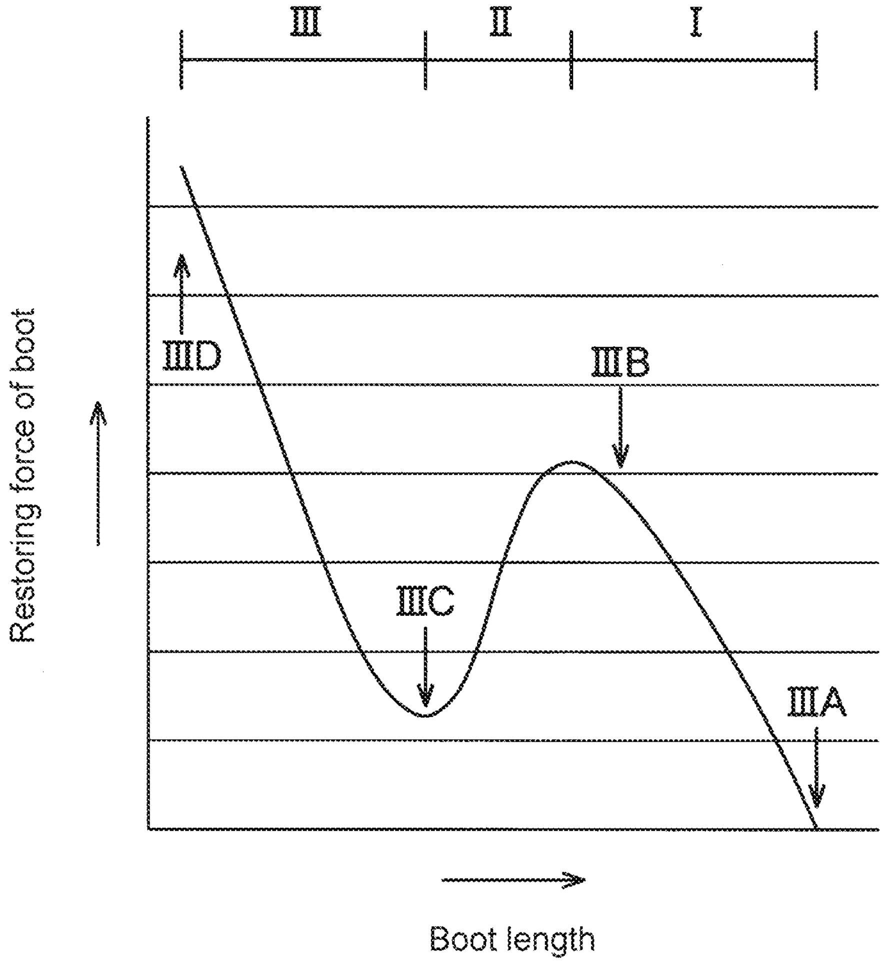
FIG. 4 is a graph schematically showing a relation between a boot length and a boot restoring force.
Figure 5:
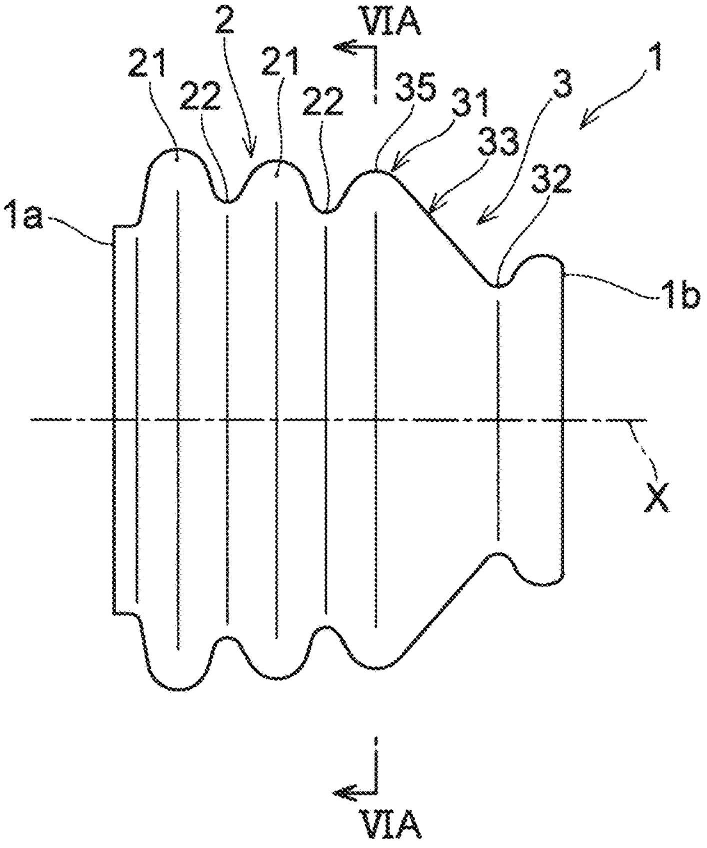
FIG. 5 is a side view of the boot having a high-rigidity portion.

FIGS. 3A to 3D show a change in extending/contracting state of the boot 1 when the lid L moves from the opened position (see FIG. 3A) via the closed position (see FIG. 3C) to the advanced position (see FIG. 3D) relative to the vehicle body B, or vice versa. Moreover, FIG. 4 schematically shows a relation between a boot length in an axis X direction of the boot 1 (horizontal axis) and a restoring force of the boot 1 in the axis X direction (vertical axis). The reference signs IIIA to IIID shown in FIG. 4 indicate boot lengths corresponding to FIGS. 3A to 3D, respectively. It is to be noted that, in FIGS. 3A to 3D, only the cross section of the upper half of the boot 1 is shown for easy understanding, but the cross section of the lower half also shows the same behavior as the cross section of the upper half.

When the lid L is in the opened position (see FIG. 3A), the other end 1*b* of the boot 1 does not abut onto the vehicle body B, so that the boot 1 is in an extended state of its natural length and has no restoring force in the axis X direction (see FIG. 4). When the lid L approaches the vehicle body B from the opened position, the other end 1*b* of the boot 1 abuts onto the vehicle body B, but at this time point, the boot 1 is in an extended state of its natural length. When the lid L further approaches the vehicle body B in the axis X direction from this position, the boot 1 is compressed in the axis X direction by being pressed against the vehicle body B by the lid L into a compressed state, as shown in FIGS. 3B to 3D, while changing in restoring force as in Stages I, II, and III shown in FIG. 4. Conversely, when the lid L moves in a direction away from the vehicle body B in the axis X direction from the advanced position (see FIG. 3D), the boot 1 extends in the axis X direction due to the restoring force of the boot 1 itself and returns to the extended state of its natural length, while changing in restoring force as in Stages III, II, and I shown in FIG. 4.

Next, transitions of the boot 1 from the extended state to the compressed state and from the compressed state to the extended state will be described in detail.

When the lid L further approaches the vehicle body B from the position where the other end 1*b* of the boot 1 abuts onto the vehicle body B, the extending portion 3 having a relatively smaller restoring force in the axis X direction than the bellows portion 2 is compressed first, as shown in FIG. 3B. As the extending portion 3 is compressed, the extending portion-side valley portion 32 of the extending portion 3 is displaced to the bellows portion 2 side along the axis X direction, and the coupling portion 33 of the extending portion 3 is curved and displaced toward the inside of the bellows portion 2 (position on the inner side in the radial direction) while forming a peak portion-side curved portion 33*a* adjacent to the extending portion-side peak portion 31 and a valley portion-side curved portion 33*b* adjacent to the extending portion-side valley portion 32. At this time, the extending portion 3 exhibits a curved S-shaped cross section at the extending portion-side peak portion 31, the peak portion-side curved portion 33*a*, the valley portion-side curved portion 33*b*, and the extending portion-side valley portion 32. An angle of inclination of the coupling portion 33 relative to the axis X increases as the coupling portion 33 moves toward the inside of the bellows portion 2, from when the boot 1 is in the extended state. As shown in FIG. 3B, when the valley portion-side curved portion 33*b* moves to a vicinity of a position on the inner side in the radial direction of the extending portion-side peak portion 31, the coupling portion 33 extends at an angle close to a direction perpendicular to the axis X. The extending portion 3 compressed in the axis X direction is configured to be curved so as to overlap in a radial direction at the peak portion-side curved portion 33*a* and the valley portion-side curved portion 33*b*, respectively, so that a restoring force acts in the radial direction. The extending portion 3 pushes out the extending portion-side peak portion 31 to the outside in the radial direction by this radial restoring force. Until the boot 1 reaches this compressed state from the extended state, the restoring force of the coupling portion 33 in the axis X direction gradually increases, and due to the increased restoring force of the coupling portion 33, the bellows portion 2 is also compressed slightly in the axis X direction, gradually increasing the restoring force of the bellows portion 2 in the axis X direction. Therefore, as shown in FIG. 4 as Stage I, the restoring force of the boot 1 increases as the boot length decreases.

When the lid L further approaches the vehicle body B from the position shown in FIG. 3B, the valley portion-side curved portion 33*b* of the coupling portion 33 is displaced to a position on the inner side in the radial direction of the bellows portion-side valley portion 22 of the bellows portion 2, and the coupling portion 33 is inclined to a side opposite to a side when extended, relative to the axis X, as shown in FIG. 3C. With the coupling portion 33 being inclined to the opposite side to the side when extended relative to the axis X, the extending portion-side peak portion 31 being pushed out to the outside in the radial direction is displaced to the inside in the radial direction, and the restoring force of the extending portion 3 in the axis X direction decreases. Accordingly, the bellows portion 2 being slightly compressed by the restoring force of the extending portion 3 extends slightly along the axis X direction, and the restoring force of the bellows portion 2 in the axis X direction also decreases. Therefore, as shown in FIG. 4 as Stage II, the restoring force of the boot 1 decreases as the boot length decreases. Again, as shown in FIG. 3C, when the extending portion 3 is compressed in the axis X direction, the extending portion 3 is configured to be curved so as to overlap in a radial direction at the peak portion-side curved portion 33*a* and the valley portion-side curved portion 33*b*, respectively, so that a restoring force acts in the radial direction. Thereby, the restoring force of the extending portion 3 in the axis X direction becomes small, and the restoring force of the boot 1 in the axis X direction also becomes small.

When the lid L further approaches the vehicle body B from the closed position shown in FIG. 3C, the extending portion 3 is displaced to the bellows portion 2 side in the axis X direction without being substantially deformed, and the bellows portion 2 is compressed along the axis X direction, so that the valley portion-side curved portion 33*b* of the coupling portion 33 is displaced to a position on the inner side in the radial direction of the bellows portion-side peak portion 21 of the bellows portion 2, as shown in FIG. 3D. With the length of the bellows portion 2 in the axis X direction being shortened, the restoring force of the bellows portion 2 in the axis X direction increases. Thereby, as shown in FIG. 4 as Stage III, the restoring force of the boot 1 increases as the boot length decreases. Also in this stage III, the extending portion 3 is configured to be curved so as to overlap in the radial direction at the peak portion-side curved portion 33*a* and the valley portion-side curved portion 33*b*, so that a restoring force acts mainly in the radial direction. Moreover, the bellows portion 2 is configured to be curved so as to overlap in the axis X direction, so that a restoring force acts mainly in the axis X direction. Thereby, the restoring force of the extending portion 3 in the axis X direction becomes small and the restoring force of the bellows portion 2 in the axis X direction becomes large, so that the restoring force of the boot 1 in the axis X direction is achieved mainly by the increased restoring force of the bellows portion 2.

Conversely, when the lid L moves away from the vehicle body B in the axis X direction from the advanced position shown in FIG. 3D, the bellows portion 2 having a larger restoring force in the axis X direction than the extending portion 3 extends first, as shown in FIG. 3C. The bellows portion 2 extends to a state close to its natural length and its restoring force is decreased, and the extending portion 3 is displaced from the inside of the bellows portion 2 toward the outside of the bellows portion 2 in the axis X direction. Since the restoring force of the bellows portion 2 in the axis X direction decreases as the bellows portion 2 extends, the restoring force of the boot 1 decreases as the boot length becomes long with the extension of the bellows portion 2, as shown in FIG. 4 as Stage III.

When the lid L moves away from the vehicle body B in the axis X direction from the closed position shown in FIG. 3C, the extending portion 3 extends due to the restoring force of the extending portion 3 in the axis X direction instead of the bellows portion 2 having decreased restoring force, as shown in FIG. 3B. At this time, the valley portion-side curved portion 33*b* of the extending portion 3 is displaced from the inside of the bellows portion 2 to the outside of the bellows portion 2 in the axis X direction, and the angle of the coupling portion 33 relative to the axis X gradually increases. Then, the coupling portion 33 extends at an angle close to a direction perpendicular to the axis X, and a restoring force to the outside in the radial direction acts to push out the extending portion-side peak portion 31 to the outside in the radial direction. Until this time point, the restoring force of the coupling portion 33 in the axis X direction gradually increases, and due to the increased restoring force of the coupling portion 33, the bellows portion 2 is also compressed slightly in the axis X direction, gradually increasing the restoring force of the bellows portion 2 in the axis X direction. Therefore, as shown in FIG. 4 as Stage II, the restoring force of the boot 1 increases as the boot length increases.

When the lid L moves in the direction away from the vehicle body B in the axis X direction from the position shown in FIG. 3B, the coupling portion 33 is displaced from the inside of the bellows portion 2 to a position on the outside in the axis X direction and is inclined to a side opposite to a side when maximally compressed, relative to the axis X. Thereby, the peak portion-side curved portion 33*a* and the valley portion-side curved portion 33*b* disappear from the coupling portion 33, so that the curved coupling portion 33 is restored to its original state, and the extending portion-side peak portion 31 having pushed out to the outside in the radial direction is restored to its original position. At this stage, as shown in FIG. 4 as Stage I, the restoring force of the boot 1 decreases as the boot length increases.

As can be understood from the descriptions above, the boot 1 is configured to have a local minimum restoring force state (state between Stage II and Stage III in FIG. 4) where the restoring force in the axis X direction increases (or decreases) after the restoring force decreases (or increases), as a compression ratio increases (or decreases), between the extended state of its natural length and the most compressed state. The boot 1 can maintain the compressed state in a quasi-stable manner in the local minimum restoring force state during the entire compression process. When the boot 1 is applied to the lid opening/closing device M that is a mounting target, the lid L in the closed position can be further suppressed from lifting off of the surface of the vehicle body by setting the closed position of the lid L to a position corresponding to this local minimum restoring force state.

As mentioned above, when the boot 1 is used so that the end in the axis X direction (the other end 1*b* in the present embodiment) is a free end, the boot 1 needs to be restored to the extended state only by the restoring force of the boot 1 itself without any assistance of a force from the outside when restoring from the compressed state to the extended state. For the purpose of easily restoring the boot 1 to the extended state only by the restoring force of the boot itself, in the boot 1 shown in FIGS. 5 to 10, the boot 1 is provided with a high-rigidity portion 35 having a higher rigidity than other parts of the extending portion 3 in the circumferential direction in a part of the extending portion 3 in the circumferential direction. The extending portion 3 is configured so that the restoring force of the extending portion 3 in the axis X direction is smaller than that of the bellows portion 2 in the axis X direction when the boot 1 is in a compressed state. However, by providing the high-rigidity portion 35 in the part of the extending portion 3 in the circumferential direction, the extending portion 3 can be easily restored to the extended state. Specifically, by increasing the rigidity of the part of the extending portion 3 in the circumferential direction compared to the other parts in the same circumferential direction, the timing of the restoring operation when the extending portion 3 is restored to the extended state can be shifted in the circumferential direction, and the restoring operation can be facilitated. For example, in the present embodiment, as mentioned above regarding the transition from the state shown in FIG. 3C to the state shown in FIG. 3B, it is necessary to push out the entire circumferential direction of the extending portion-side peak portion 31 to the outside in the radial direction at the same time in attempting to extend the extending portion 3 in the axis X direction at all of the parts of the extending portion 3 in the circumferential direction. In order to do so, it is necessary to increase the outer diameter of the extending portion-side peak portion 31, and a large restoring force is required. On the other hand, by providing the high-rigidity portion 35 in the part of the extending portion 3 in the circumferential direction, the extending portion-side peak portion 31 on an extension line in the axis X direction of the circumferential position where the high-rigidity portion 35 is provided is first displaced to the outside in the radial direction without increasing the diameter of the extending portion-side peak portion 31, and the other parts of the extending portion-side peak portion 31 in the circumferential direction are displaced following the displaced part, so that the restoring operation can be performed without requiring much force.

The position of the high-rigidity portion 35 in the circumferential direction is not particularly limited as long as the high-rigidity portion 35 is provided in a part of the extending portion 3 in the circumferential direction and can shift the timing of the restoring operation of the extending portion 3 in the circumferential direction. In the examples shown in FIGS. 5 to 9, the high-rigidity portion 35 is provided only at one location in the circumferential direction of the extending portion 3, but may be provided at multiple locations in the circumferential direction of the extending portion 3. In the case where the high-rigidity portion 35 is provided at multiple locations in the circumferential direction of the extending portion 3, the respective high-rigidity portions 35 are preferably provided at positions asymmetrical to the axis X (positions shifted in the circumferential direction from positions that are point symmetrical to the axis X). By providing the high-rigidity portion 35 at positions asymmetrical to the axis X, the outer diameter of the extending portion-side peak portion 31 is suppressed from increasing by pushing out multiple parts of the extending portion-side peak portion 31 in a direct opposite direction when restoring operations are performed at multiple circumferential positions where the high-rigidity portion 35 is provided, so that the extending portion-side peak portion 31 can be partially easily pushed out to the outside in the radial direction, and the restoring operation of the extending portion 3 can be facilitated.

The position of the high-rigidity portion 35 in the axis X direction is not particularly limited as long as the high-rigidity portion 35 is provided in a part of the extending portion 3 in the circumferential direction and can shift the timing of the restoring operation of the extending portion 3 in the circumferential direction. For example, in the embodiments shown in FIG. 5 and FIGS. 6A to 6B, the high-rigidity portion 35 has an extended portion 35*a* that is provided in a part of the extending portion-side peak portion 31 in the circumferential direction and that extends toward the inside and/or the outside of the extending portion-side peak portion 31 in the radial direction (the inside in the radial direction in the illustrated example). The high-rigidity portion 35 is formed to have a thicker thickness than other parts of the extending portion 3. By providing the high-rigidity portion 35 on the extending portion-side peak portion 31, the extending portion-side peak portion 31 is displaced to the outside in the radial direction when the extending portion 3 is restored, and a restoring force to return to the original position after that is increased, so that the extending portion 3 becomes easy to be restored as a whole. Moreover, by increasing the rigidity by increasing the thickness, the high-rigidity portion 35 can be formed more easily compared with a case of increasing the rigidity by using other members. Furthermore, in a case where the boot 1 is manufactured using a mold, since the mold is easily molded, the boot 1 can be easily manufactured.

Figure 6A:
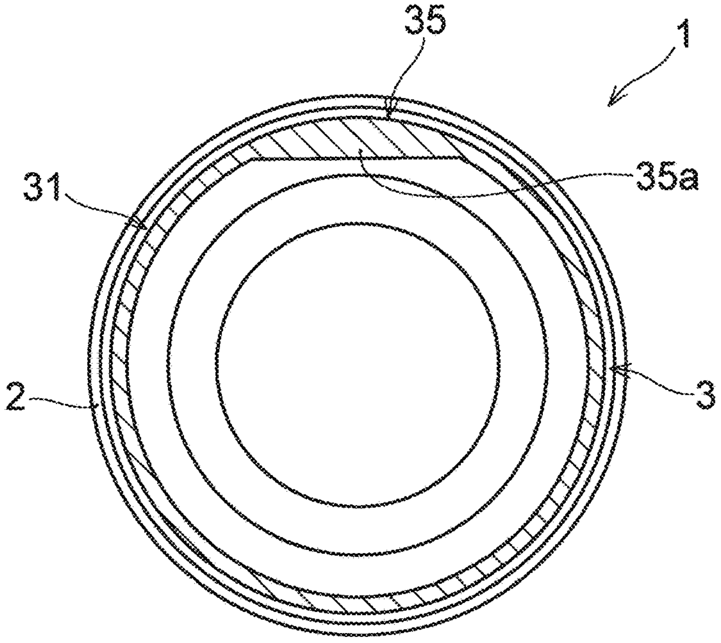
FIG. 6A is a sectional view taken along the line VIA-VIA in FIG. 5.
Figure 6B:
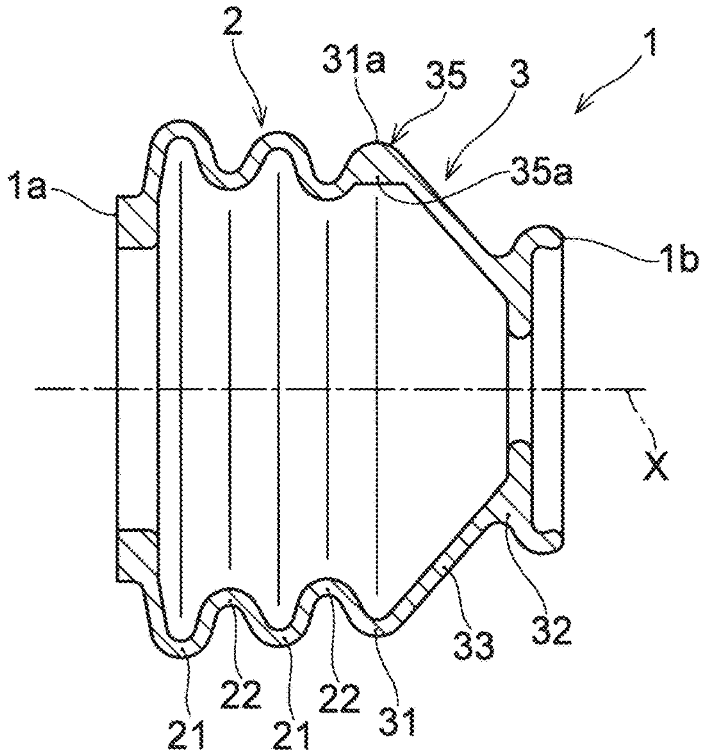
FIG. 6B is a sectional view of the boot of FIG. 5 along an axis direction.

The thickness of the high-rigidity portion 35 provided on the extending portion-side peak portion 31 is not particularly limited as long as the high-rigidity portion 35 is formed thicker than the other parts of the extending portion 3. However, from the viewpoint of increasing the restoring force of the part of the extending portion-side peak portion 31 provided with the high-rigidity portion 35, the maximum thickness of the extending portion-side peak portion 31 in the high-rigidity portion 35 is preferably 1.2 times or more, and further preferably 1.25 times or more, of the thicknesses of the other parts of the extending portion 3. Moreover, from the viewpoint of facilitating deformation during compression of the part of the extending portion-side peak portion 31 provided with the high-rigidity portion 35, the maximum thickness of the extending portion-side peak portion 31 in the high-rigidity portion 35 is preferably 1.5 times or less, further preferably 1.4 times or less, and even further preferably 1.3 times or less, of the thicknesses of the other parts of the extending portion 3. Furthermore, as shown in FIG. 6B, the high-rigidity portion 35 of the extending portion-side peak portion 31 is preferably formed so as to have the maximum thickness at an apex portion 31*a* of the extending portion-side peak portion 31 which is a portion having the largest outer diameter, of the extending portion-side peak portion 31, in the axis X direction. By forming the high-rigidity portion 35 so as to have the maximum thickness at the apex portion 31*a* of the extending portion-side peak portion 31, deformation of the part of the extending portion-side peak portion 31 provided with the high-rigidity portion 35 during compression can be facilitated.

The length in the circumferential direction of the high-rigidity portion 35 provided on the extending portion-side peak portion 31 is not particularly limited as long as the high-rigidity portion 35 is provided in a part of the extending portion-side peak portion 31 in the circumferential direction. However, from the viewpoint of increasing the restoring force of the part of the extending portion-side peak portion 31 provided with the high-rigidity portion 35, the length of the high-rigidity portion 35 in the circumferential direction is preferably 1/20 or more, further preferably 1/15 or more, and even further preferably 1/10 or more, of the length of the extending portion-side peak portion 31 in the circumferential direction. Moreover, from the viewpoint of increasing asymmetry of pushing-out of the extending portion-side peak portion 31 to the outside in the radial direction, the length of the high-rigidity portion 35 in the circumferential direction is preferably 1/4 or less, further preferably 1/6 or less, even further preferably 1/8 or less, of the length of the extending portion-side peak portion 31 in the circumferential direction. Furthermore, as shown in FIG. 6A, the high-rigidity portion 35 is preferably formed so that the thickness thereof continuously decreases from the maximum thickness part toward both sides in the circumferential direction, in the circumferential direction of the extending portion-side peak portion 31. Thereby, when the extending portion 3 is restored from the compressed state to the extended state, the extending portion 3 is gradually restored from the maximum thickness part to the both sides in the circumferential direction, in the circumferential direction of the extending portion-side peak portion 31, so that the extending portion 3 can be more easily restored to the extended state.

Figure 7:
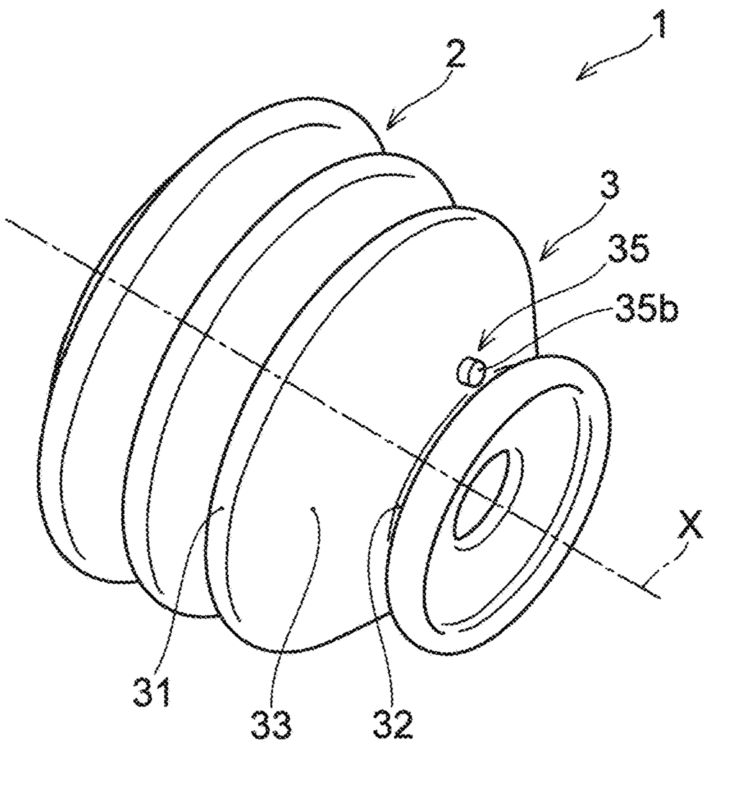
FIG. 7 is a perspective view of a variation of the boot.
Figure 8:
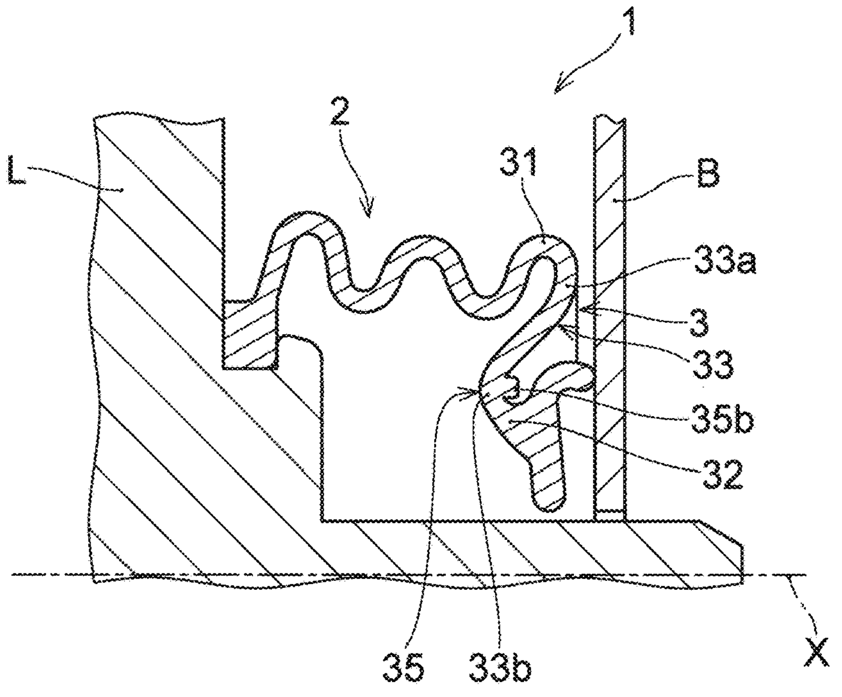
FIG. 8 is a partial sectional view of the lid opening/closing device in a state where the lid is in a closed position in the lid opening/closing device to which the boot of FIG. 7 is mounted.

For example, as in the variations shown in FIGS. 7 and 8, the high-rigidity portion 35 may have a projection 35*b* that is provided at a position adjacent to the extending portion-side valley portion 32 in the coupling portion 33, which is a position where the coupling portion 33 is curved when the boot 1 is compressed (the valley portion-side curved portion 33*b*), and that protrudes from the coupling portion 33 to the inside and/or the outside in the radial direction (the outside in the radial direction in the illustrated example). With the high-rigidity portion 35 having the projection 35*b*, the high-rigidity portion 35 is formed to have a thicker thickness than other parts of the extending portion 3. With the high-rigidity portion 35 being provided on the valley portion-side curved portion 33*b* adjacent to the extending portion-side valley portion 32, a restoring force of a part of the valley portion-side curved portion 33*b* provided with the high-rigidity portion 35 increases, thereby increasing a force of pushing out the extending portion-side peak portion 31 to the outside in the radial direction, so that the extending portion 3 can be more easily restored to the extended state. Again, by increasing the rigidity by increasing the thickness, the high-rigidity portion 35 can be formed more easily compared with the case of increasing the rigidity by using other members. Furthermore, in a case where the boot 1 is manufactured using a mold, since the mold is easily molded, the boot 1 can be easily manufactured.

The thickness of the high-rigidity portion 35 provided adjacent to the extending portion-side valley portion 32 is not particularly limited as long as the high-rigidity portion 35 is formed thicker compared with the other parts of the extending portion 3. However, from the viewpoint of increasing the restoring force of the part of the extending portion 3 provided with the high-rigidity portion 35 in the circumferential direction, the thickness of the high-rigidity portion 35 is preferably 1.1 times or more, further preferably 1.3 times or more, even further preferably 1.5 times or more, of the thickness of the other parts of the extending portion 3. Moreover, from the viewpoint of facilitating deformation, during compression, of the part of the extending portion 3 provided with the high-rigidity portion 35 in the circumferential direction, the thickness of the high-rigidity portion 35 is preferably 2 times or less, further preferably 1.8 times or less, even further preferably 1.6 times or less, of the thickness of the other parts of the extending portion 3.

The length in the circumferential direction of the high-rigidity portion 35 is not particularly limited as long as the high-rigidity portion 35 is provided in a part of the coupling portion 33 in the circumferential direction in the valley portion-side curved portion 33*b*. However, from the viewpoint of increasing the restoring force of the part of the coupling portion 33 provided with the high-rigidity portion 35, the length of the high-rigidity portion 35 in the circumferential direction is preferably 1/20 or more, further preferably 1/15 or more, and even further preferably 1/10 or more, of the length of the coupling portion 33 in the circumferential direction. Moreover, from the viewpoint of increasing asymmetry of pushing-out of the extending portion-side peak portion 31 to the outside in the radial direction, the length of the high-rigidity portion 35 in the circumferential direction is preferably 1/4 or less, further preferably 1/6 or less, even further preferably 1/8 or less, of the length of the coupling portion 33 in the circumferential direction.

Figure 9:
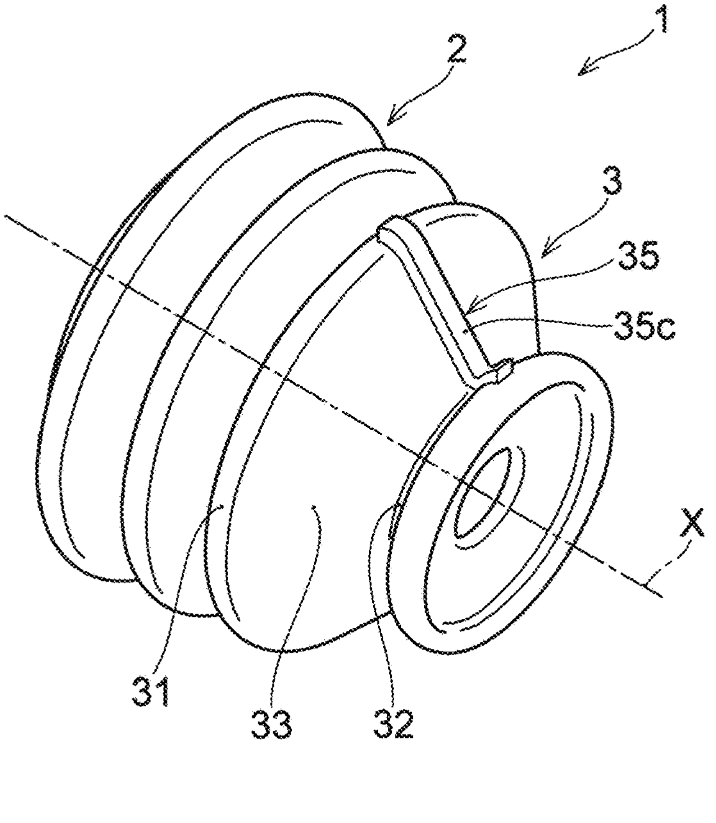
FIG. 9 is a perspective view of another variation of the boot.

For example, as in the variation shown in FIG. 9, the high-rigidity portion 35 may be provided continuously so as to extend from the extending portion-side peak portion 31 through the coupling portion 33 to the extending portion-side valley portion 32 along a plane including the axis X. The high-rigidity portion 35 has a protruding portion 35*c* that protrudes from the extending portion 3 to the inside and/or the outside in the radial direction (the outside in the radial direction in the illustrated example), where the protruding portion 35*c* is provided continuously so as to extend from the extending portion-side peak portion 31 through the coupling portion 33 to the extending portion-side valley portion 32 along the plane including the axis X. With the high-rigidity portion 35 having the protruding portion 35*c*, the high-rigidity portion 35 is formed to have a thicker thickness than the other parts of the extending portion 3. By providing the high-rigidity portion 35 over substantially the entire length of the extending portion 3 in the axis X direction, a restoring force of the part of the extending portion 3 provided with the high-rigidity portion 35 in the circumferential direction increases, thereby increasing a force of pushing out the extending portion-side peak portion 31 to the outside in the radial direction, so that the extending portion 3 can be more easily restored to the extended state. It is to be noted that, in the present embodiment, the high-rigidity portion 35 is provided only in the extending portion 3, without being provided in the bellows portion 2.

The thickness of the high-rigidity portion 35 provided extending from the extending portion-side peak portion 31 through the coupling portion 33 to the extending portion-side valley portion 32 is not particularly limited as long as the high-rigidity portion 35 is formed thicker compared with the other parts of the extending portion 3. However, from the viewpoint of increasing the restoring force of the part of the extending portion 3 provided with the high-rigidity portion 35 in the circumferential direction, the thickness of the high-rigidity portion 35 is preferably 1.1 times or more, further preferably 1.3 times or more, even further preferably 1.5 times or more, of the thickness of the other parts of the extending portion 3. Moreover, from the viewpoint of facilitating deformation, during compression, of the part of the extending portion 3 provided with the high-rigidity portion 35 in the circumferential direction, the thickness of the high-rigidity portion 35 is preferably 2 times or less, further preferably 1.8 times or less, even further preferably 1.6 times or less, of the thickness of the other parts of the extending portion 3.

The length in the circumferential direction of the high-rigidity portion 35 is not particularly limited as long as the high-rigidity portion 35 is provided in a part of the coupling portion 33 in the circumferential direction. However, from the viewpoint of increasing the restoring force of the part of the coupling portion 33 provided with the high-rigidity portion 35, the length of the high-rigidity portion 35 in the circumferential direction is preferably 1/20 or more, further preferably 1/15 or more, and even further preferably 1/10 or more, of the length of the coupling portion 33 in the circumferential direction. Moreover, from the viewpoint of increasing asymmetry of pushing-out of the extending portion-side peak portion 31 to the outside in the radial direction, the length of the high-rigidity portion 35 in the circumferential direction is preferably 1/4 or less, further preferably 1/6 or less, even further preferably 1/8 or less, of the length of the coupling portion 33 in the circumferential direction.

REFERENCE SIGNS LIST

1. Boot
1*a*. One end of boot in axis direction
1*b*. Other end of boot in axis direction
11. Mounted portion
12. Abutting portion
12*a*. Opening
13. Axis misalignment-suppressing portion
14 Guiding portion
14*a*. Insertion hole
2. Bellows portion
2*a*. One end of bellows portion in axis direction
2*b*. Other end of bellows portion in axis direction
21. Bellows portion-side peak portion
22. Bellows portion-side valley portion
3. Extending portion
3*a*. One end of extending portion in axis direction
3*b*. Other end of extending portion in axis direction
31. Extending portion-side peak portion
31*a*. Apex portion
32. Extending portion-side valley portion
33. Coupling portion
33*a*. Peak portion-side curved portion
33*b*. Valley portion-side curved portion
34. Tongue piece portion
35. High-rigidity portion
35*a*. Extended portion
35*b*. Projection
35*c*. Protruding portion
AP. Abutting end portion
B. Base (Vehicle body)
B1. Opening
D1. Length in axis direction between extending portion-side peak portion and extending portion-side valley portion
D2. Length in axis direction between bellows portion-side peak portion and bellows portion-side valley portion
ID. Inner diameter of bellows portion-side valley portion
EC. Extendable/contractible portion
FI. Fluid injecting unit
FIa. Tip of fluid injecting unit
FI1. Wall portion
FI2. Outflow hole
L. Movable portion (Lid)
M. Mounting target (Lid opening/closing device)
O. Mounting target object
O1. Mounting portion
O11. First large-diameter portion
O12. Small-diameter portion
O13. Second large-diameter portion
O2. Extension portion
OD1. Outer diameter of other end of extending portion
OD2. Outer diameter of extending portion-side valley portion
OD3. Outer diameter of bellows portion-side peak portion
OP. Operation portion
R. Recessed portion
X. Axis

The invention claimed is:

1. A boot that extends along an axis direction, is formed into a tubular shape that is extendable and contractible in the axis direction, wherein the boot is configured to be mounted to a mounting portion of a mounting target object by injecting fluid inside the boot by a fluid injecting unit, wherein the boot comprises:

an annular mounted portion that is provided on one end side in the axis direction and is to be mounted to the mounting portion, an abutting portion that is provided on an other end side in the axis direction and onto which a tip of the fluid injecting unit can abut toward the one end side in the axis direction along the axis direction, and an extendable/contractible portion that extends along the axis direction between the mounted portion and the abutting portion, wherein the abutting portion extends along a radial direction on the other end side of the boot in the axis direction of the boot, is formed into an annular shape along a direction around the axis of the boot, and is provided, on an inner side in the radial direction of the abutting portion, with an opening that allows fluid communication between an inside and an outside of the boot, wherein the boot comprises, on an outer periphery of the abutting portion in the radial direction, an axis misalignment-suppressing portion configured to suppress axis misalignment of the tip of the fluid injecting unit relative to the opening when the tip of the fluid injecting unit abuts onto the abutting portion, wherein the abutting portion is arranged to extend both the inner side and the outer side in the radial direction from an end of the extendable/contractible portion on the other end side in the axis direction, and wherein the axis misalignment suppressing portion is formed to extend axially outward along the axis direction of the boot from the outer periphery of the abutting portion in the radial direction.

2. The boot of claim 1, wherein the mounting target object has an extension portion that extends along the axis direction in at least a part of the inside of the boot when the boot is mounted, wherein the boot comprises a guiding portion that is configured to guide the extension portion so as to be capable of extending and contracting along the axis direction with respect to the extension portion, and wherein the guiding portion extends radially inward from an inner circumference of the boot, is formed into the annular shape along the direction around the axis of the boot, and is provided, on an inner side in the radial direction of the guiding portion, with the opening through which the extension portion can be inserted.

3. The boot of claim 2, wherein at least a part of the abutting portion is provided on a surface of the guiding portion on the other end side in the axis direction.

4. The boot of claim 1, wherein the abutting portion is formed into a plate shape deformable in the axis direction.

* * * * *